US012802362B2

(12) United States Patent
Lee et al.

(10) Patent No.: US 12,802,362 B2
(45) Date of Patent: Nov. 17, 2026

(54) ELECTRONIC DEVICE AND METHOD FOR DISPLAYING AND CONTROLLING HOME APPLIANCE

(71) Applicant: Samsung Electronics Co., Ltd., Suwon-si (KR)

(72) Inventors: Dongmin Lee, Suwon-si (KR); Hyeokjin Choi, Suwon-si (KR); Miyoung Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 131 days.

(21) Appl. No.: 18/494,265

(22) Filed: Oct. 25, 2023

(65) Prior Publication Data

US 2024/0257471 A1 Aug. 1, 2024

Related U.S. Application Data

(63) Continuation of application No. PCT/KR2023/016227, filed on Oct. 19, 2023.

(30) Foreign Application Priority Data

Jan. 31, 2023 (KR) ........................ 10-2023-0012915

(51) Int. Cl.
*G06T 19/00* (2011.01)
*G16Y 40/30* (2020.01)

(52) U.S. Cl.
CPC ............ *G06T 19/003* (2013.01); *G16Y 40/30* (2020.01)

(58) Field of Classification Search
None
See application file for complete search history.

(56) References Cited

U.S. PATENT DOCUMENTS

| | | | |
|---|---|---|---|
| 9,100,207 B2 | 8/2015 | Alberth, Jr. et al. | |
| 9,310,984 B2 | 4/2016 | Kim | |
| 9,672,260 B2 | 6/2017 | Logue et al. | |
| 10,068,373 B2 | 9/2018 | Lee et al. | |
| 10,091,015 B2 | 10/2018 | Kennedy | |

(Continued)

FOREIGN PATENT DOCUMENTS

| | | | |
|---|---|---|---|
| CN | 115174299 A | 10/2022 | |
| EP | 1548679 A2 * | 6/2005 | ............. G08B 25/10 |

(Continued)

OTHER PUBLICATIONS

International Search Report dated Jan. 23, 2024, issued in International Patent Application No. PCT/KR2023/016227.

(Continued)

*Primary Examiner* — Hilina K Demeter

(74) *Attorney, Agent, or Firm* — Jefferson IP Law, LLP

(57) ABSTRACT

An electronic device is provided. The electronic device includes a display including a display area and at least one processor electrically connected to the display. The at least one processor displays a three-dimensional (3D) map including at least one of indoor space status information including an environmental status of an indoor space or home appliance status information including an operating status of at least one home appliance disposed in the indoor space and control an operation of the at least one home appliance based on a user input to a predetermined area on the 3D map.

16 Claims, 22 Drawing Sheets

(56) References Cited

U.S. PATENT DOCUMENTS

| | | | | |
|---|---|---|---|---|
| 10,742,440 | B2 | 8/2020 | Lee et al. | |
| 10,901,380 | B2 * | 1/2021 | Kim | G10L 15/00 |
| 11,054,794 | B2 * | 7/2021 | Liu | G05B 15/02 |
| 11,108,586 | B2 | 8/2021 | Seol | |
| 11,317,778 | B2 * | 5/2022 | Kim | A47L 11/4011 |
| 11,444,799 | B2 | 9/2022 | Lee et al. | |
| 11,671,275 | B2 | 6/2023 | Lee et al. | |
| 11,782,570 | B2 * | 10/2023 | Hsiao | G06F 3/04815 715/736 |
| 2013/0052946 | A1 | 2/2013 | Chatterjee et al. | |
| 2014/0081433 | A1 * | 3/2014 | Cheong | H04L 12/2809 700/90 |
| 2014/0316636 | A1 * | 10/2014 | Hong | G01C 21/206 901/1 |
| 2014/0355588 | A1 * | 12/2014 | Cho | H04L 12/6418 370/338 |
| 2016/0005229 | A1 | 1/2016 | Lee et al. | |
| 2017/0034468 | A1 | 2/2017 | Won et al. | |
| 2019/0339693 | A1 | 11/2019 | Menon et al. | |
| 2020/0204392 | A1 * | 6/2020 | Chen | G08C 23/04 |
| 2020/0333034 | A1 * | 10/2020 | Hwang | F24F 11/58 |
| 2021/0018914 | A1 | 1/2021 | Menon et al. | |
| 2021/0027538 | A1 | 1/2021 | Bleyer et al. | |
| 2021/0067622 | A1 * | 3/2021 | Park | H04M 1/72415 |
| 2023/0266757 | A1 | 8/2023 | Menon et al. | |

FOREIGN PATENT DOCUMENTS

| | | | | |
|---|---|---|---|---|
| JP | 2021-526464 | A | 10/2021 | |
| KR | 10-2010-0050103 | A | 5/2010 | |
| KR | 10-1238302 | B1 | 3/2013 | |
| KR | 10-2017-0015622 | A | 2/2017 | |
| KR | 10-2017-0098874 | A | 8/2017 | |
| KR | 10-2019-0024228 | A | 3/2019 | |
| KR | 10-1976424 | B1 | 5/2019 | |
| KR | 10-2020-0120973 | A | 10/2020 | |
| KR | 10-2021-0117530 | A | 9/2021 | |
| KR | 10-2342372 | B1 | 12/2021 | |
| KR | 10-2362117 | B1 | 2/2022 | |
| KR | 10-2402056 | B1 | 5/2022 | |
| KR | 10-2022-0150131 | A | 11/2022 | |
| KR | 10-2023-0012368 | A | 1/2023 | |
| WO | WO-2022025408 | A1 * | 2/2022 | G10L 15/22 |
| WO | 2022/234944 | A1 | 11/2022 | |

OTHER PUBLICATIONS

Extended European search report dated Jan. 23, 2026; European Appln. No. 23920108.0-1218 / 4593330 PCT/KR2023016227.

* cited by examiner (a) (b)

(a) (b) (c)

ELECTRONIC DEVICE AND METHOD FOR DISPLAYING AND CONTROLLING HOME APPLIANCE

CROSS-REFERENCE TO RELATED APPLICATION(S)

This application is a continuation application, claiming priority under § 365 (c), of an International application No. PCT/KR2023/016227, filed on Oct. 19, 2023, which is based on and claims the benefit of a Korean patent application number 10-2023-0012915, filed on Jan. 31, 2023, in the Korean Intellectual Property Office, the disclosure of which is incorporated by reference herein in its entirety.

BACKGROUND

Field

The disclosure relates to an electronic device and method for displaying and controlling a home appliance disposed in an indoor space.

Description of Related Art

The growth of wireless communication technology leads to development of smart device control techniques for controlling indoor devices (e.g., televisions (TVs), air conditioners, refrigerators, air purifiers, smart plugs, or lightings) on the user's portable terminal.

In relation, developed are cloud services for linking built-in Internet of things (IoT) devices, home services, and IoT networks disposed in the indoor space to smart devices through the user's portable terminal and user interfaces related to the cloud services.

The user may easily control various smart devices disposed in the indoor space by controlling the smart devices through the user interface of the portable terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for displaying and controlling a home appliance disposed in an indoor space based on input data including three-dimensional (3D) data of the home appliance and the indoor space.

Additional aspects will be set forth in part in the description which follows and, in part, will be apparent from the description, or may be learned by practice of the presented embodiments.

In accordance with an aspect of the disclosure, an electronic device is provided. The electronic device includes a display including a display area and at least one processor electrically connected to the display. The at least one processor displays a 3D map including at least one of indoor space status information which includes an environmental status of an indoor space or home appliance status information which includes an operating status of at least one home appliance disposed in the indoor space. The at least one processor controls an operation of the at least one home appliance based on a user input to a predetermined area on the 3D map.

In an embodiment of the disclosure, the at least one processor displays visual information about the at least one home appliance, as a 3D animation, on the 3D map, based on the home appliance status information.

In an embodiment of the disclosure, the visual information about the at least one home appliance includes at least one of a light on/off state, output wind direction, output wind speed, output temperature, door open/close state, or moving state of the at least one home appliance.

In an embodiment of the disclosure, the at least one processor displays at least one subtask of the at least one home appliance for performing a predetermined operation on the 3D map.

In an embodiment of the disclosure, the at least one home appliance includes a first object and a second object performing the at least one subtask for performing the predetermined operation. The predetermined operation includes performing a first subtask by the first object and performing a second subtask associated with the first subtask by the second object.

In an embodiment of the disclosure, the at least one processor sequentially displays, on the 3D map, an image displaying an operation sequence of the first object and the second object, a zoomed-in image of the first object, a pop-up window including a text describing the first subtask, a zoomed-in image of the second object, and a pop-up window including text describing the second subtask.

In an embodiment of the disclosure, the predetermined operation includes moving the at least one home appliance in the indoor space, detecting a target object included in the indoor space by the at least one home appliance, capturing at least one image of the target object by the at least one home appliance, and displaying a target object image captured by the at least one home appliance.

In an embodiment of the disclosure, the at least one processor sequentially displays an image of the at least one home appliance moving in the indoor space, an image of the at least one home appliance detecting a target object included in the indoor space, an image of the at least one home appliance capturing the target object, and an image of the target object captured by the at least one home appliance.

In an embodiment of the disclosure, the at least one processor controls the at least one home appliance performing at least one subtask based on a predetermined operation on the 3D map.

In an embodiment of the disclosure, the predetermined operation includes determining a driving environment of the at least one home appliance and setting at least one of a power setting, position, or operation mode of the at least one home appliance to a pre-stored operation configuration value.

In an embodiment of the disclosure, the at least one processor receives a user input for an operational environment of the at least one home appliance. The at least one processor controls at least one of a power setting, position, or operation mode of the at least one home appliance, based on an operation configuration value corresponding to the operational environment.

In an embodiment of the disclosure, the at least one processor displays, on the 3D map, the indoor space status information and the home appliance status information using at least one of a text, a value, a color, an icon, a graph, or a contour line.

In an embodiment of the disclosure, the indoor space status information includes at least one of an air quality, temperature, humidity, lighting, or noise of the indoor space.

In an embodiment of the disclosure, the at least one processor generates an indoor space status history based on a change in the indoor space status information for a reference or a predetermined period. The at least one processor displays the indoor space status history for a specified time period (e.g., hourly).

In an embodiment of the disclosure, the home appliance status information includes at least one of an operation mode, remaining time, energy usage, temperature, remaining battery, or position of the at least one home appliance.

In an embodiment of the disclosure, the at least one processor detects an operation error in the at least one home appliance based on the home appliance status information. The at least one processor displays the operation error and an action guide.

In accordance with another aspect of the disclosure, a method for displaying and controlling a home appliance is provided. The method includes displaying a 3D map including at least one of indoor space status information which includes an environmental status of an indoor space or home appliance status information which includes an operating status of at least one home appliance disposed in the indoor space and controlling an operation of the at least one home appliance based on a user input to a predetermined area on the 3D map.

In an embodiment of the disclosure, displaying the 3D map includes displaying visual information about the at least one home appliance, as a 3D animation, on the 3D map, based on the home appliance status information.

In an embodiment of the disclosure, displaying the 3D map includes displaying at least one subtask of the at least one home appliance for performing a predetermined operation on the 3D map.

In an embodiment of the disclosure, controlling the at least one home appliance includes controlling the at least one home appliance performing at least one subtask based on a predetermined operation on the 3D map.

According to various embodiments of the disclosure, an electronic device and method of the disclosure display a 3D map includes an indoor space and a home appliance based on input data. Further, the electronic device and method of the disclosure display visual information about the home appliance, as a 3D animation, on the 3D map.

Accordingly, the electronic device and method of the disclosure intuitively display the position and operating status of the home appliance in the indoor space on the 3D map.

Further, according to various embodiments of the disclosure, the electronic device and method of the disclosure sequentially display subtasks of the home appliance based on a predetermined operation. Further, the electronic device and method of the disclosure control the home appliance performing the subtask based on the predetermined operation.

Therefore, the electronic device and method of the disclosure enhance usability and convenience of a home appliance by sequentially displaying and controlling associated operations of the home appliance for performing a predetermined operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
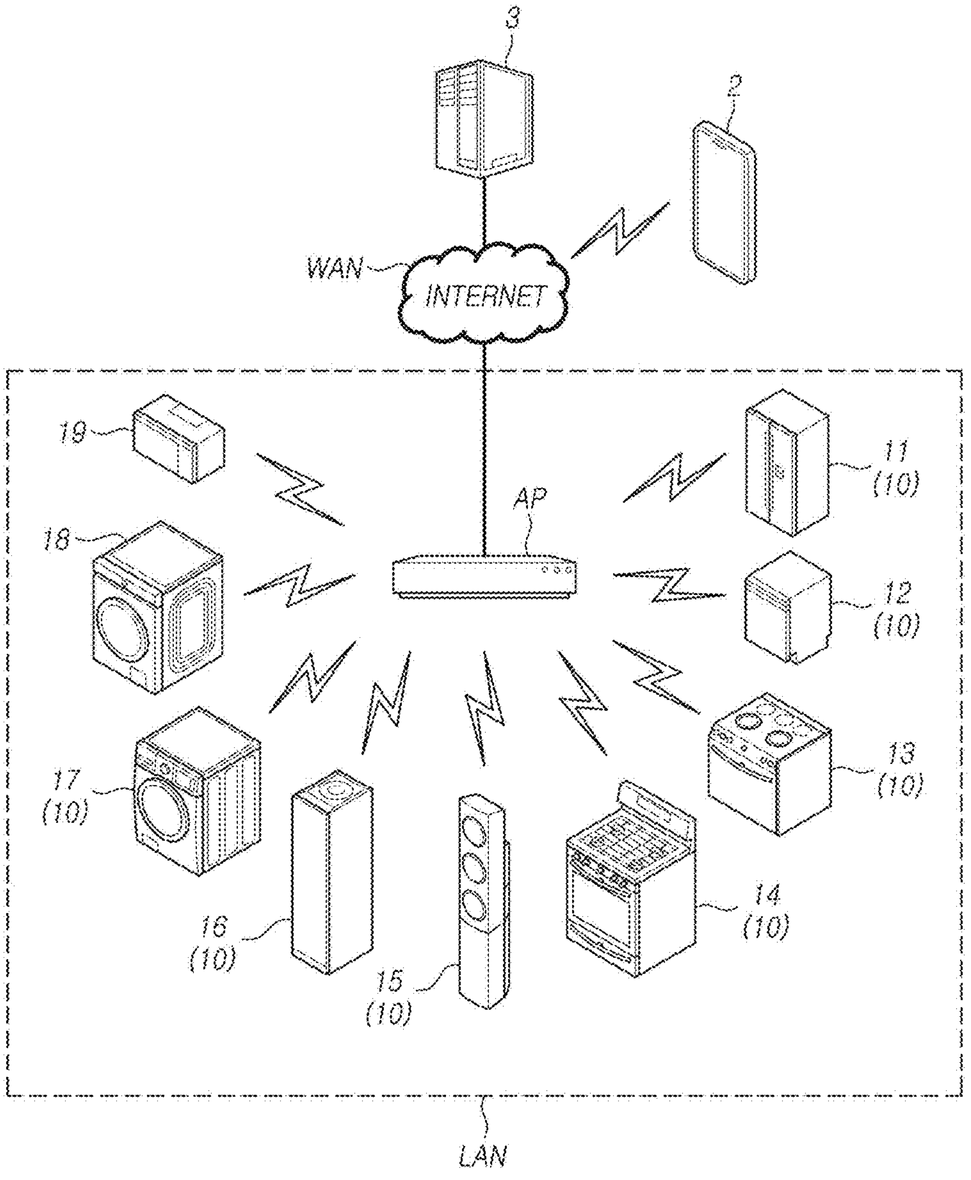
FIG. 1 illustrates a home appliance according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It will be further understood that the terms "comprise" and/or "have," as used herein, specify the presence of stated features, integers, steps, operations, elements, and/or components, but do not preclude the presence or addition of one or more other features, integers, steps, operations, elements, components, and/or groups thereof.

It will be understood that when a component is referred to as "connected to," "coupled to", "supported on," or "contacting" another component, the components may be connected to, coupled to, supported on, or contact each other directly or via a third component.

Throughout the specification, when one component is positioned "on" another component, the first component may be positioned directly on the second component, or other component(s) may be positioned between the first and second component.

The term "and/or" may denote a combination(s) of a plurality of related components as listed or any of the components.

Hereinafter, the working principle and embodiments of the disclosure are described with reference to the accompanying drawings.

FIG. 1 illustrates a home appliance according to an embodiment of the disclosure.

Referring to FIG. 1, a home appliance 10 may include a communication module capable of communicating with at least one home appliance, a user device 2 or a server 3, a user interface for receiving a user input and/or outputting information to the user, at least one processor for controlling the operation (or tasks) of the home appliance 10, and at least one memory storing a program for controlling the operation of the home appliance 10.

The home appliance 10 may be at least one of various types of home appliances. For example, as illustrated, the home appliance 10 may include at least one of a refrigerator 11, a dishwasher 12, an electric range 13, an electric oven 14, an air conditioner 15, a steam closet 16, a washing machine 17, a dryer 18, and a microwave oven 19, but is not limited thereto. The home appliance 10 may further include various types of home appliances, such as a robot vacuum, a vacuum cleaner, and a television, which are not illustrated in the drawings. In addition to home appliances mentioned above, other home appliance(s), the user device 2, or a device that can be connected to the server 3 and perform the operations described below may be included in the home appliance 10 according to an embodiment.

The server 3 may include a communication module capable of communicating with another server, home appliance 10, or the user device 2, at least one processor capable of processing data received from the other server, home appliance 10, or user device 2, and at least one memory capable of storing a program for processing data or processed data. The server 3 may be implemented as various computing devices, such as a workstation, a cloud, a data drive, and a data station. The server 3 may be implemented as one or more servers physically or logically divided based on functions, detailed configurations of functions, data, or the like, and may transmit and receive data and process the transmitted and received data through communication between the servers.

The server 3 may perform functions such as manage the user account, register the home appliance 10 with the user account, and manage or control the registered home appliance 10. For example, the user may access the server 3 through the user device 2 to create a user account. The user account may be identified by an ID and a password set by the user. The server 3 may register the home appliance 10 in the user account according to a predetermined procedure. For example, the server 3 may register, manage, and control the home appliance 10 by verifying/authenticating the identification information (e.g., a serial number or a MAC address) of the home appliance 10 to the user account. The user device 2 may include a communication module capable of communicating with the home appliance 10 or the server 3, a user interface for receiving a user input or outputting information to the user, at least one processor for controlling the operation of the user device 2, and at least one memory for storing a program for controlling the operation of the user device 2.

The user device 2 may be carried by the user or may be disposed in the user's home or office. The user device 2 may include, but is not limited to, a personal computer, a terminal, a mobile phone, a smart phone, a handheld device, or a wearable device.

A program for controlling the home appliance 10, i.e., an application, may be stored in the memory of the user device 2. The application may be pre-installed on the user device 2 or may be downloaded from an external server.

The user may access the server 3 to create a user account by executing the application installed on the user device 2 and may communicate with the server 3 based on the logged-in user account to register the home appliance 10.

For example, when a user programs/manipulates the home appliance 10 to connect to the server 3 by following the instructions provided by the application installed on the user device 2, the identification information (e.g., serial number or MAC address) of the home appliance 10 associated with the user account may be stored in the server 3, thereby allowing the home appliance 10 to be registered to the user account.

The user may control the home appliance 10 using the application installed on the user device 2. For example, when the user logs in to the user account with the application installed on the user device 2, the home appliance 10 registered in the user account is displayed, and when a control command for the home appliance 10 is inputted, the control command may be transferred to the home appliance 10 through the server 3.

The network may include both a wired network and a wireless network. The wired network may include a cable network, a telephone network, and the like, and the wireless network may include all networks that transmit and receive signals through radio waves. The wired network and the wireless network may be connected to each other.

The network may include a wide area network (WAN), such as the Internet, a local area network (LAN) formed around an access point (AP), and a short-range wireless network that does not pass through the AP. The short-range wireless network may include, but is not limited to, Bluetooth™ (IEEE 802.15.1), Zigbee (IEEE 802.15.4), wireless-fidelity (Wi-Fi) direct, near-field communication (NFC), and Z-wave.

The AP may connect the home appliance 10 or the user device 2 to a WAN to which the server 3 is connected. The home appliance 10 or the user device 2 may be connected to the server 3 through a WAN.

The AP may communicate with the home appliance 10 or the user device 2 using wireless communication, such as wi-fi (Wi-fi™, IEEE 802.11), Bluetooth (Bluetooth™, IEEE 802.15.1), Zigbee (IEEE 802.15.4), or the like, and may access the WAN using wired communication, but is not limited thereto.

According to various embodiments of the disclosure, the home appliance 10 may be directly connected to the user device 2 or the server 3 without passing through the AP.

The home appliance 10 may be connected to the user device 2 or the server 3 through a long-range wireless network or a short-range wireless network.

For example, the home appliance 10 may be connected to the user device 2 through a short-range wireless network (e.g., wi-fi direct).

As another example, the home appliance 10 may be connected to the user device 2 or the server 3 through a WAN using a long-range wireless network (e.g., a cellular communication module).

As another example, the home appliance 10 may access a WAN using wired communication and may be connected to the user device 2 or the server 3 through the WAN.

When the home appliance 10 is able to access the WAN using wired communication, it may operate as an access repeater. Accordingly, the home appliance 10 may connect another home appliance to the WAN to which the server 3 is connected. Further, the other home appliance may connect the home appliance 10 to the WAN to which the server 3 is connected.

The home appliance 10 may transmit information about the operation or the status to the other home appliance(s), the user device 2, or the server 3 through the network. For example, when the request is received from the server 3, if a specific event occurs in the home appliance 10, periodically, or in real time, the home appliance 10 may transmit information about the operation or the status to the other home appliance(s), the user device 2, or the server 3. When the information about the operation or the status is received from the home appliance 10, the server 3 may update the stored information about the operation or the status of the home appliance 10 and transmit the updated information about the operation and the status of the home appliance 10 to the user device 2 through the network. Here, updating information may include various operations for changing existing information, such as adding new information to the existing information and replacing existing information with new information.

The home appliance 10 may obtain various information from the other home appliance(s), the user device 2, or the server 3 and provide the obtained information to the user. For example, the home appliance 10 may obtain information related to the function of the home appliance 10 (e.g., recipe, washing method, or the like) and various environmental information (e.g., weather, temperature, humidity, or the like) from the server 3, and output the obtained information through the user interface.

The home appliance 10 may operate according to a control command received from the other home appliance (s), the user device 2, or the server 3. For example, when the home appliance 10 obtains the user's prior approval to operate according to the control command of the server 3, even if there is no user input, the home appliance 10 may operate according to the control command received from the server 3. Here, the control command received from the server 3 may include a control command input by the user through the user device 2 or a control command based on a predetermined condition but is not limited thereto.

The user device 2 may transmit information about the user to the home appliance 10 or the server 3 through the communication module. For example, the user device 2 may transmit information about the position of the user, the health condition of the user, the taste of the user, the schedule of the user, and the like to the server 3. The user device 2 may transmit the information about the user to the server 3 according to prior approval by the user.

The home appliance 10, the user device 2, or the server 3 may determine a control command using a technology, such as artificial intelligence. For example, the server 3 may receive information about the operation or the status of the home appliance 10, receive the information about the user of the user device 2, process the information using technology, such as artificial intelligence, and transmit the processing result or the control command to the home appliance 10 or the user device 2 based on the processing result.

Figure 2:
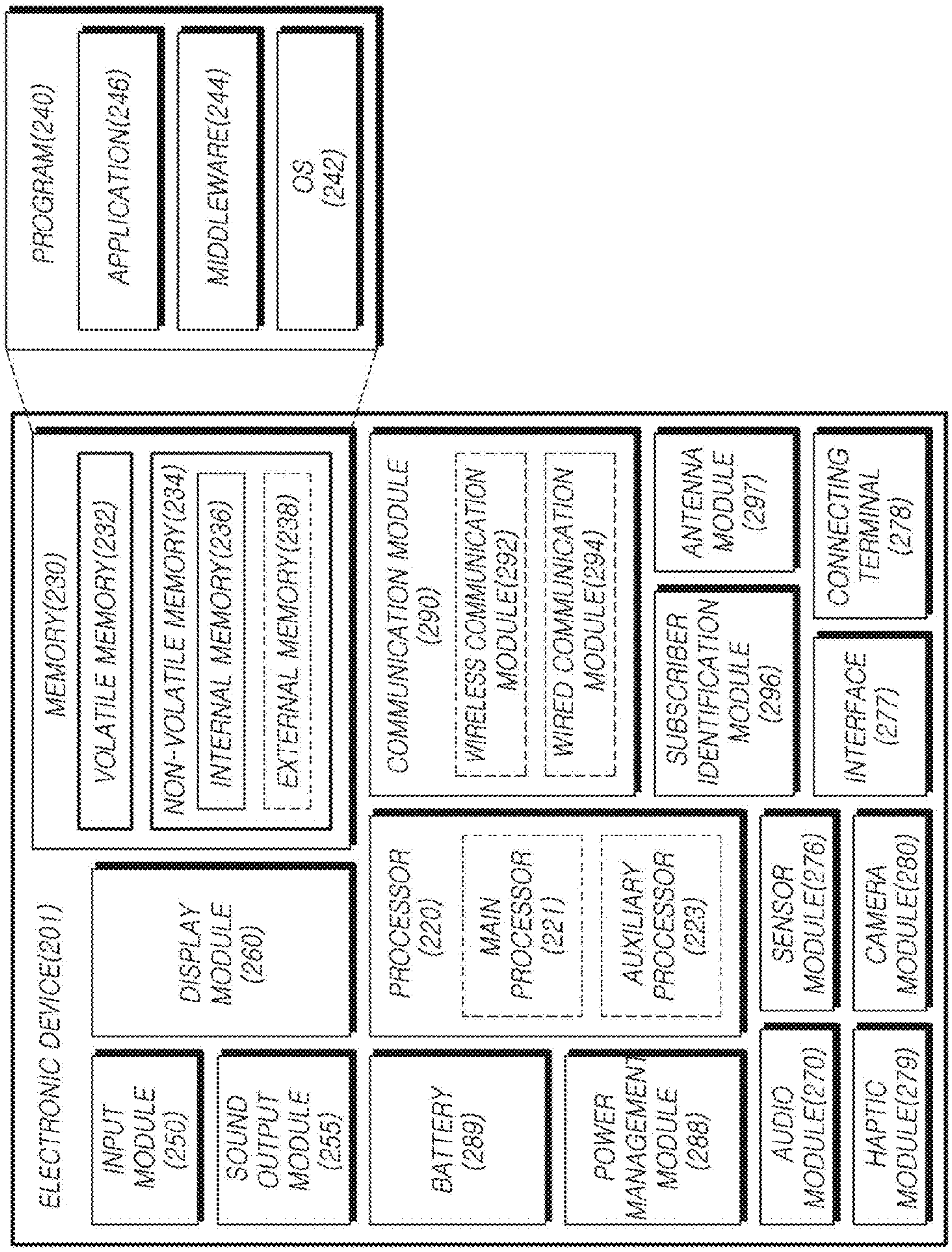
FIG. 2 is a block diagram illustrating an electronic device according to an embodiment of the disclosure.

FIG. 2 is a block diagram illustrating an electronic device according to an embodiment of the disclosure. For example, an electronic device 201 may correspond to the user device 2 of FIG. 1.

Referring to FIG. 2, the electronic device 201 may communicate with an external electronic device (not shown) through a short-range wireless communication network or may communicate with at least one of the external electronic device or a server (e.g., the server 3 of FIG. 1) through a long-range wireless communication network. According to an embodiment of the disclosure, the electronic device 201 may communicate with the external electronic device through a server. According to an embodiment of the disclosure, the electronic device 201 may include a processor 220, a memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In an embodiment of the disclosure, at least one (e.g., the connecting terminal 278) of the components may be omitted from the electronic device 201, or one or more other components may be added in the electronic device 101. According to an embodiment of the disclosure, some (e.g., the sensor module 276, the camera module 280, or the antenna module 297) of the components may be integrated into a single component (e.g., the display module 260).

The processor 220 may execute, for example, a software (e.g., a program 240) to control at least one other component (e.g., a hardware or software component) of the electronic device 201 coupled with the processor 220 and may perform various data processing or computations. According to one embodiment of the disclosure, as at least part of the data processing or computations, the processor 220 may store a command or data received from another component (e.g., the sensor module 276 or the communication module 290) in a volatile memory 232, process the command or the data stored in the volatile memory 232, and store resulting data in a non-volatile memory 234. According to an embodiment of the disclosure, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 201 includes the main processor 221 and the auxiliary processor 223, the auxiliary processor 223 may be configured to use lower power than the main processor 221 or to be specified for a designated function. The auxiliary processor 223 may be implemented as separate from or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., a sleep) state, or together with the main processor 221 while the main processor 221 is in an active state (e.g., executing an application). According to an embodiment of the disclosure, the auxiliary processor 223 (e.g., an image signal processor or a communication processor) may be implemented as part of another component (e.g., the camera module 280 or the communication module 290) functionally related to the auxiliary processor 123. According to an embodiment of the disclosure, the auxiliary processor 223 (e.g., the neural processing unit) may include a hardware structure specified for artificial intelligence model processing. The artificial intelligence model may be generated via machine learning. Such learning may be performed, e.g., by the electronic device 201 where the artificial intelligence model is performed or by a separate server. Learning algorithms may include, but are not limited to, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include a software (e.g., the program 240) and input/output data for a command related thereto. The memory 230 may include the volatile memory 232 or the non-volatile memory 234. The non-volatile memory 234 may include an internal memory 236 and an external memory 238.

The program 240 may be stored in the memory 230 as a software and may include an operating system (OS) 242, middleware 244, or an application 246.

The input module 250 may receive a command or data to be used by other component(s) (e.g., the processor 220) of the electronic device 201, from an external source (e.g., a user) of the electronic device 201. The input module 250 may include a microphone, a mouse, a keyboard, keys (e.g., buttons), or a digital pen (e.g., a stylus pen).

The sound output module 255 may output sound signals to the outside of the electronic device 201. The sound output module 255 may include a speaker or a receiver. The speaker may be used for general purposes, such as playing multimedia or playing record. The receiver may be used for receiving incoming calls. According to an embodiment of the disclosure, the receiver may be implemented as separate from or as part of the speaker.

The display module 260 may visually provide information to the outside (e.g., a user) of the electronic device 201. For example, the electronic device 201 may include a display with a display area that visually provides information to the outside. The display module 260 may include a display, a hologram device, or a projector, and a control circuit to control at least one of the corresponding devices. According to an embodiment of the disclosure, the display module 260 may include a touch sensor configured to detect a touch, or a pressure sensor configured to measure the intensity of a force generated by the touch.

The audio module 270 may convert a sound into an electrical signal and vice versa. According to an embodiment of the disclosure, the audio module 270 may obtain the sound via the input module 250 or output the sound via the sound output module 255 or an external electronic device (e.g., a speaker or headphone) directly or wirelessly connected to the electronic device 201.

The sensor module 276 may detect an operational state (e.g., power or temperature) of the electronic device 201 or an environmental state (e.g., a state of a user) external to the electronic device 101, and then generate an electrical signal or data value corresponding to the detected state. According to an embodiment of the disclosure, the sensor module 276 may include a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 277 may support one or more designated protocols to be used for the electronic device 201 to be connected to the external electronic device physically or wirelessly. According to an embodiment of the disclosure, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected to the external electronic device. According to an embodiment of the disclosure, the connecting terminal 278 may include a HDMI connector, a USB connector, a SD card connector, or an audio connector (e.g., a headphone connector).

The haptic module 279 may convert an electrical signal into a mechanical stimulus (e.g., a vibration or motion) or electrical stimulus which may be recognized by a user via his tactile sensation or kinesthetic sensation. According to an embodiment of the disclosure, the haptic module 279 may include a motor, a piezoelectric element, or an electric stimulator.

The camera module 280 may capture a still image or moving images. According to an embodiment of the disclosure, the camera module 280 may include one or more lenses, image sensors, image signal processors, or flashes.

The power management module 288 may manage power supplied to the electronic device 201. According to one embodiment of the disclosure, the power management module 288 may be implemented as at least part of, for example, a power management integrated circuit (PMIC).

The battery 289 may supply power to at least one component of the electronic device 201. According to an embodiment of the disclosure, the battery 289 may include a primary cell which is not rechargeable, a secondary cell which is rechargeable, or a fuel cell.

The communication module 290 may support establishing a direct or physical (e.g., wired) communication channel or a wireless communication channel between the electronic device 201 and the external electronic device (e.g., an electronic device or a server) and performing communication via the established communication channel. The communication module 290 may include one or more communication processors that are operable independently from the processor 220 (e.g., the application processor (AP)) and supports a direct (e.g., wired) communication or a wireless communication. According to an embodiment of the disclosure, the communication module 290 may include a wireless communication module 292 (e.g., a cellular communication module, a short-range wireless communication module, or a global navigation satellite system (GNSS) communication module) or a wired communication module 294 (e.g., a LAN communication module or a power line communication (PLC) module). A corresponding one of these communication modules may communicate with the external electronic device via a first network (e.g., a short-range communication network, such as Bluetooth™, Wi-Fi direct, or infrared data association (IrDA)) or a second network (e.g., a long-range communication network, such as a legacy cellular network, a 5G network, a next-generation communication network, the Internet, or a computer network (e.g., LAN or WAN). These various types of communication modules may be implemented as a single component (e.g., a single chip) or may be implemented as multi components (e.g., multi-chips) separate from each other. The wireless communication module 292 may identify or authenticate the electronic device 201 in a communication network, such as the first network or the second network, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, the external electronic device, or the network system. According to an embodiment of the disclosure, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device). According to an embodiment of the disclosure, the antenna module 297 may include one antenna including a radiator formed of a conductor or conductive pattern formed on a substrate (e.g., a printed circuit board (PCB)). According to an embodiment of the disclosure, the antenna module 297 may include a plurality of antennas (e.g., an antenna array). In this case, at least one antenna appropriate for a communication scheme used in a communication network, such as the first network or the second network, may be selected from a plurality of antennas by, e.g., the communication module 290. The signal or the power may then be transmitted or received between the communication module 290 and the external electronic device via the selected at least one antenna. According to an embodiment of the disclosure, other parts (e.g., radio frequency integrated circuit (RFIC)) than the radiator may be further formed as part of the antenna module 297.

According to various embodiments of the disclosure, the antenna module 297 may form a mmWave antenna module. According to an embodiment of the disclosure, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) via an inter-peripheral communication scheme (e.g., a bus, general purpose input and output (GPIO), serial peripheral interface (SPI), or mobile industry processor interface (MIPI)).

According to an embodiment of the disclosure, instructions or data may be transmitted or received between the electronic device 201 and the external electronic device via the server coupled with the second network. The external electronic devices each may be a device of the same or a different type from the electronic device 201. According to an embodiment of the disclosure, all or some of operations to be executed at the electronic device 201 may be executed at one or more of the external electronic devices. For example, if the electronic device 201 performs a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment of the disclosure, the external electronic device may include an IoT device. The server may be an intelligent server using machine learning and/or a neural network. According to an embodiment of the disclosure, the external electronic device or the server may be included in the second network. The electronic device 201 may be applied to intelligent services (e.g., smart home, smart city, smart car, or health-care) based on 5G communication technology or IoT-related technology.

For example, the processor 220 may display and control a home appliance disposed in an indoor space based on input data including 3D data of the home appliance and the indoor space.

For example, the processor 220 may display a 3D map including an indoor space and a home appliance based on input data. Further, the processor 220 may display visual information about the home appliance, as a 3D animation, on the 3D map.

For example, the processor 220 may sequentially display subtasks of the home appliance based on a predetermined operation. Further, the processor 220 may control the home appliance that performs the subtask based on the predetermined operation.

An operation in which the electronic device 201 displays and controls a home appliance according to embodiments of the disclosure will be exemplarily described below with reference to FIGS. 3, 4, 5, 6, 7A, 7B, 7C, 8, 9A, 9B, 9C, 10A, 10B, 10C, 11A, 11B, 12, 13, and 14.

Figure 3:
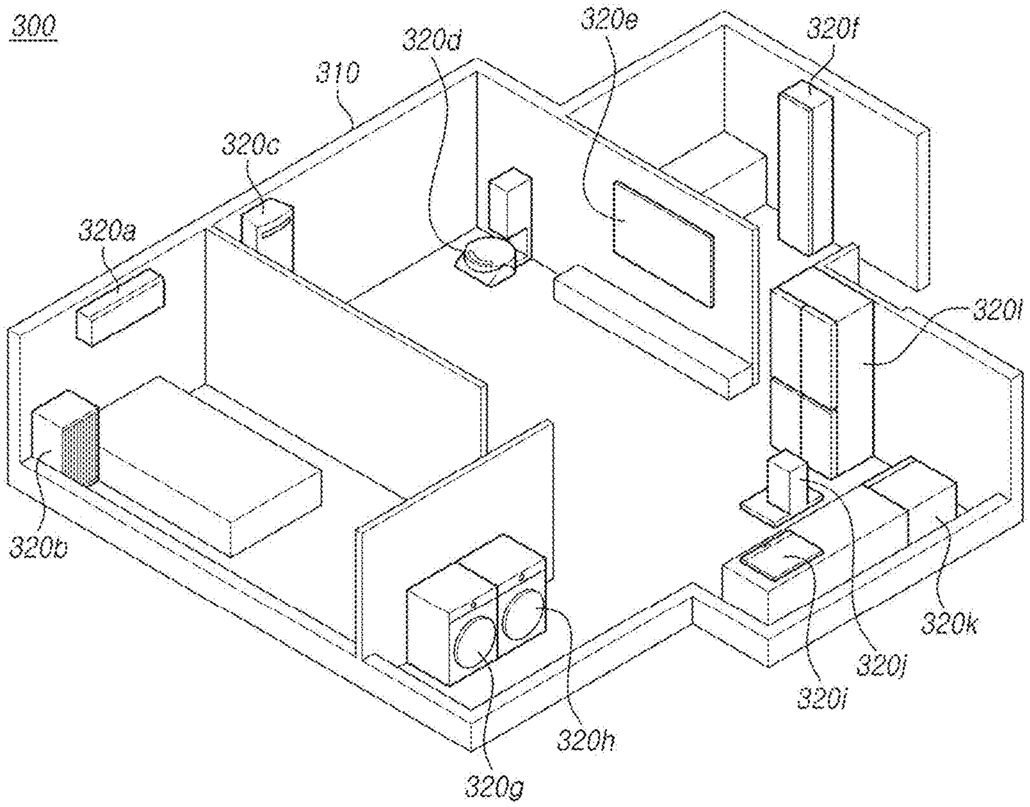
FIG. 3 illustrates a 3D map according to an embodiment of the disclosure.

FIG. 3 illustrates a 3D map according to an embodiment of the disclosure.

Referring to FIG. 3, the electronic device may display a 3D map 300 including an indoor space and a home appliance based on input data. For example, the input data may include 3D data of the indoor space and the home appliance. For example, the 3D map 300 may include a 3D image of an indoor space 310 including at least one divided space. For example, the 3D map 300 may include 3D images for home appliances 320*a* to 3201 disposed in predetermined divided spaces of the indoor space 310.

For example, the indoor space may be a predetermined indoor space including at least one divided space, such as an apartment, an office, a restaurant, a cafe, a hospital, and a school. The indoor space may include at least one home appliance.

For example, the home appliance may include at least one of a wall-mounted air conditioner 320*a*, an air purifier 320*b*, a standing air conditioner 320*c*, a robot vacuum 320*d*, a TV 320*e*, a steam closet 320*f*, a washing machine 320*g*, a dryer 320*h*, an induction 320*i*, a hood 320*j*, a dishwasher 320*k*, and a refrigerator 3201. However, the types of home appliances of the disclosure are not limited to the above examples, and may include other various home appliances in addition to the above-mentioned home appliances.

According to an embodiment of the disclosure, the electronic device may obtain input data in which an indoor space and at least one home appliance are mapped to 3D images.

For example, the electronic device may receive input data in which the indoor space and at least one home appliance are mapped to the 3D images from an external server (e.g., the server 3 of FIG. 1). The external server may store 3D space information of the indoor space. The external server may store device information and user account information of at least one home appliance. In other words, the electronic device may receive input data in which the indoor space and the home appliance are previously mapped from the external server.

As another example, the memory (e.g., the memory 230 of FIG. 2) of the electronic device may store an input data in which the indoor space and at least one home appliance are mapped to 3D images. The processor (e.g., the processor 220 of FIG. 2) of the electronic device may obtain the input data from the memory. In other words, the electronic device may execute the input data pre-stored in the memory by using the processor.

As another example, the electronic device may obtain a floor plan data for the indoor space and generate a 3D image for the indoor space. The electronic device may obtain a position data of the home appliance and map the 3D image of the home appliance onto the 3D image of the indoor space. In other words, the electronic device may generate an input data based on the floor plan data for the indoor space and the position data of the home appliance.

The electronic device may increase or decrease the size of a predetermined area of the 3D map 300 based on a user input. For example, the electronic device may increase the size and display at least one of the indoor spaces of the 3D map 300. For example, the electronic device may display the entire indoor space by reducing the 3D map image 300.

The electronic device may focus on at least one home appliance on the 3D map 300 based on a user input. For example, the electronic device may increase the size and display a predetermined home appliance on the 3D map 300. For example, the electronic device may align a predetermined home appliance on the 3D map 300 to the center of the display area.

The electronic device may rotate the 3D map 300 based on a user input. For example, the electronic device may control the display angle of the 3D map 300 based on a user input. In other words, the user may select a direction and an angle of the 3D map 300 displayed on the electronic device.

According to an embodiment of the disclosure, the electronic device may change a method of displaying the indoor space and at least one home appliance. For example, the electronic device may provide a function button for selecting at least one of a card type image (not shown), a two-dimensional (2D) map (not shown), and the 3D map 300. For example, the electronic device may provide a map view switching button, and may switch the card type image to the 3D map 300 based on a user's selection of the map view switching button. For example, the electronic device may provide a map view switching button and may switch the 2D map to the 3D map 300 based on a user's selection of the map view switching button.

Figure 4:
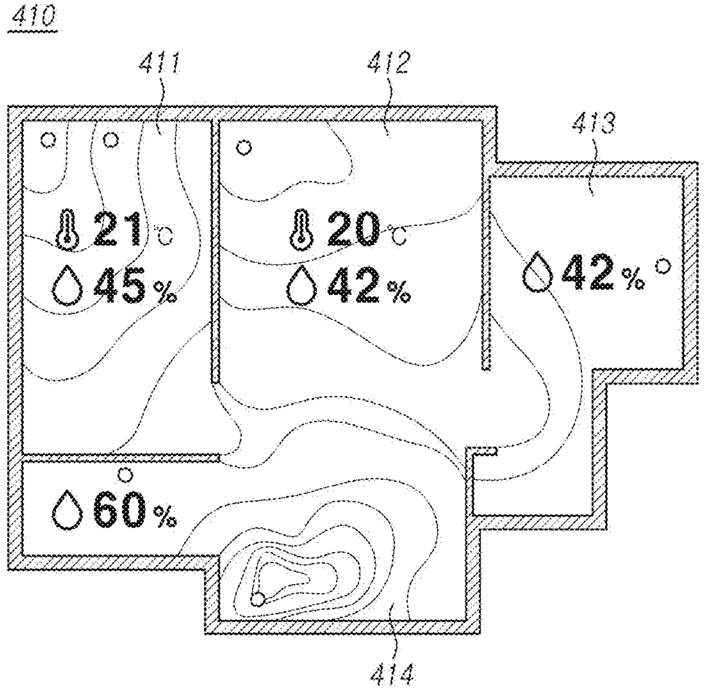
FIG. 4 illustrates a 3D map including indoor space status information according to an embodiment of the disclosure.
Figure 5:
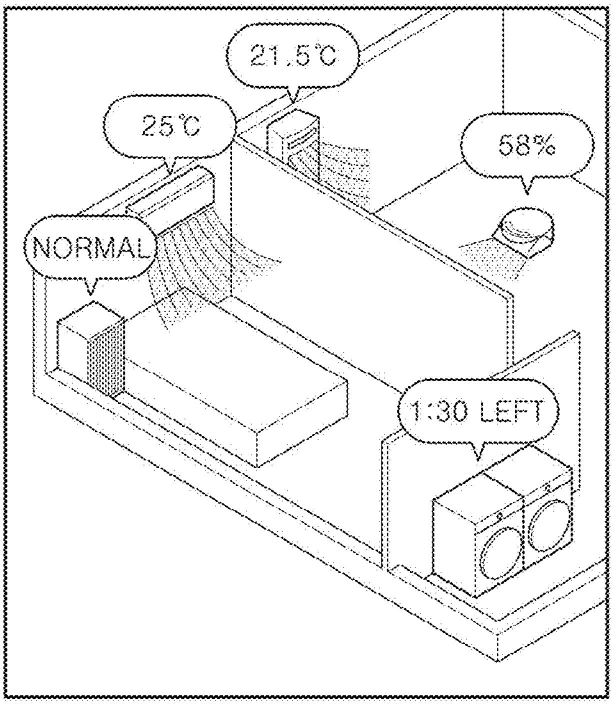
FIG. 5 illustrates a 3D map including home appliance status information according to an embodiment of the disclosure.
Figure 6:
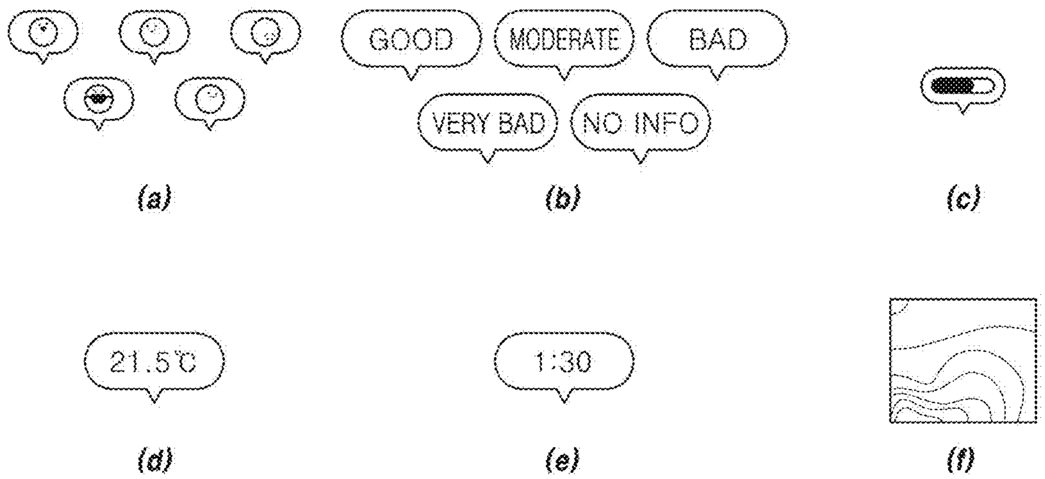
FIG. 6 illustrates displaying indoor space status information and home appliance status information on a 3D map according to an embodiment of the disclosure.

FIG. 4 illustrates a 3D map including indoor space status information according to an embodiment of the disclosure. FIG. 5 illustrates a 3D map including home appliance status information according to an embodiment of the disclosure. FIG. 6 illustrates displaying indoor space status information and home appliance status information on a 3D map according to an embodiment of the disclosure.

Referring to FIGS. 4, 5, and 6, the electronic device may display a 3D map including at least one of indoor space status information and home appliance status information. For example, the 3D map may include at least one of indoor space status information and home appliance status information.

According to an embodiment of the disclosure, the electronic device may display indoor space status information corresponding to the status of an indoor space 410 on the 3D map. Specifically, the electronic device may display the indoor space status information using at least one of a text, a numerical value, a color, an icon, a graph, and a contour line on the 3D map. For example, the indoor space status information may include at least one of an air quality, temperature, humidity, lighting, and noise of the indoor space 410.

Specifically, the indoor space 410 may include at least one divided space (e.g., 411, 412, 413, and 414). The electronic device may display indoor space status information for each divided space. For example, the electronic device may receive the indoor space status information from the at least one home appliance through a network. For example, the electronic device may receive the indoor space status information from a separate sensor installed on the indoor space 410 through a network.

The electronic device may display at least one of air quality, temperature, humidity, lighting, and noise for each divided space using at least one of text, numerical values, colors, icons, graphs, and contour lines. As shown in FIG. 4, the electronic device may display the average temperature (e.g., 21° C.) and the average humidity (e.g., 45%) of the first divided space 411 using numerical values and icons. For example, the electronic device may display the temperature distribution of the first divided space 411 using a color and a contour line. Similarly, the electronic device may display the average temperature, average humidity, and temperature distribution for each of the second divided space 412, the third divided space 413, and the fourth divided space 414 using at least one of text, numerical values, colors, icons, graphs, and contour lines.

According to an embodiment of the disclosure, the electronic device may display home appliance status information corresponding to the status of the at least one home appliance on the 3D map. Specifically, the electronic device may display the home appliance status information using at least one of a text, a numerical value, a color, an icon, a graph, and a contour line on the 3D map. For example, the home appliance status information may include at least one of an operation mode, remaining time, energy usage, temperature, remaining battery, and position of the at least one home appliance.

Specifically, the electronic device may display home appliance status information based on the real-time operating status of each home appliance disposed at a predetermined position in the indoor space 410. For example, the electronic device may receive home appliance status information including the operating status of the home appliance from the home appliance through a network.

As shown in FIG. 5, the electronic device may display home appliance status information based on the current operating status of the home appliance. For example, the electronic device may display the air quality of the divided space detected by the air purifier, as text, on the 3D map. For example, the electronic device may display a desired temperature setting of the wall-mounted air conditioner, as a numerical value, on the 3D map. For example, the electronic device may display a desired temperature setting of the standing air conditioner, as a numerical value, on the 3D map. For example, the electronic device may display the remaining battery of the robot vacuum, as a numerical value, on the 3D map. For example, the electronic device may display the remaining time of the specific operation of the washing machine, as a numerical value, on the 3D map.

Meanwhile, the indoor space status information and the home appliance status information displayed on the 3D map are not limited to the examples illustrated in FIGS. 4 and 5, and may include various methods other than the above-mentioned display method. For example, the electronic device may display the indoor space status information and the home appliance status information using at least one of a text, a numerical value, a color, an icon, a graph, and a contour line on the 3D map. As illustrated in FIG. 6, the indoor space status information and the home appliance status information may be displayed using at least one of an icon (a) including a facial expression, a text (b) indicating a status, a bar graph (c), a numerical value (d) for temperature, a numerical value (e) for the remaining time, and a contour line (f).

Figure 7A:
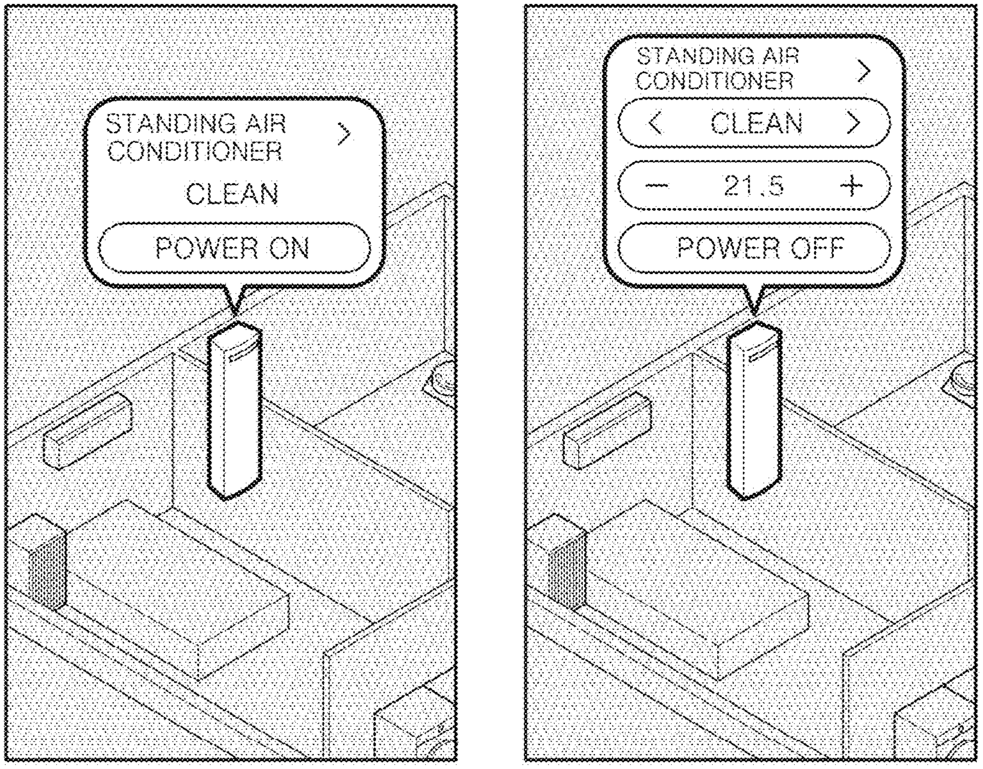
FIGS. 7A, 7B, and 7C illustrate an operation for controlling a home appliance on a 3D map according to various embodiments of the disclosure.
Figure 7B:
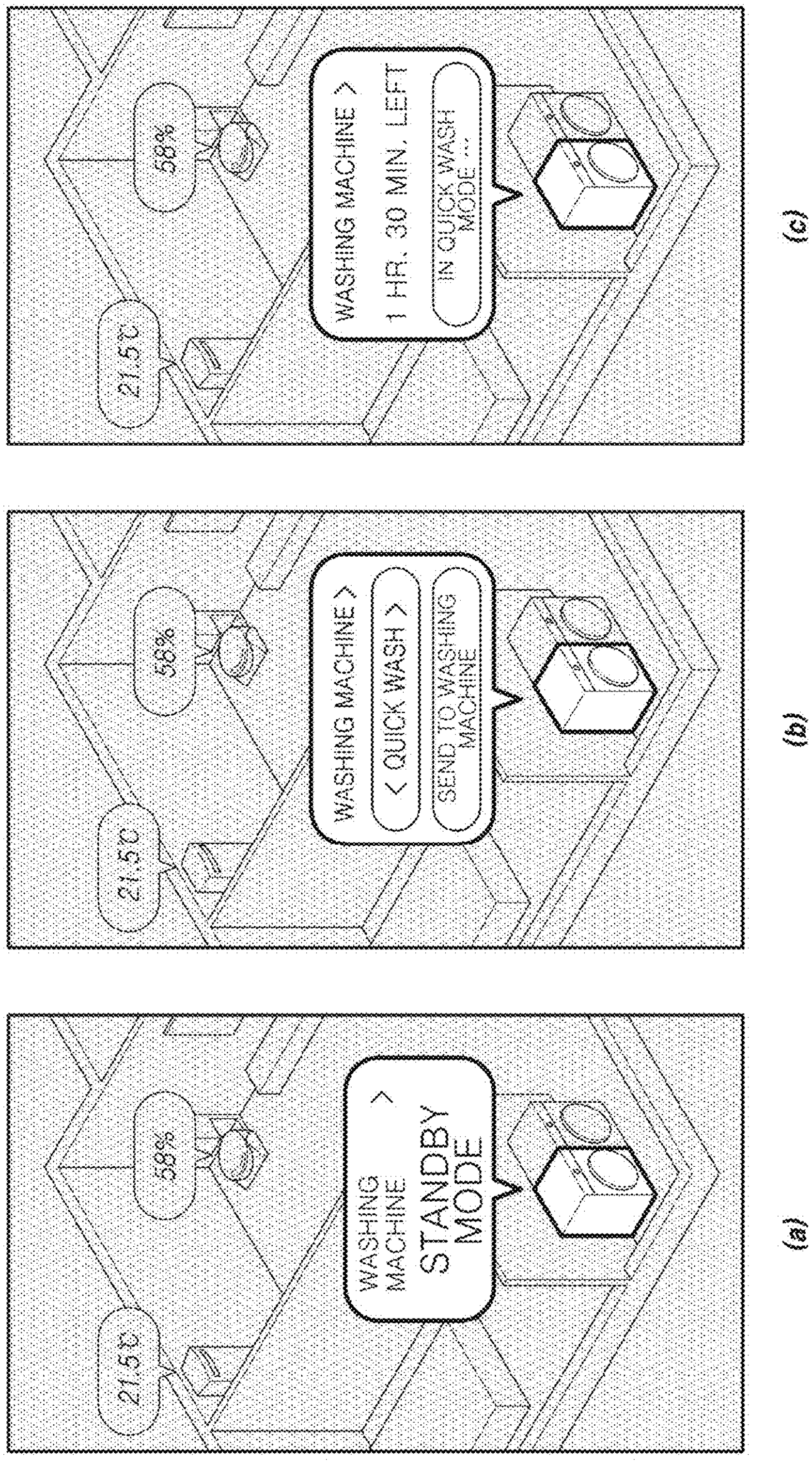
Figure 7C:
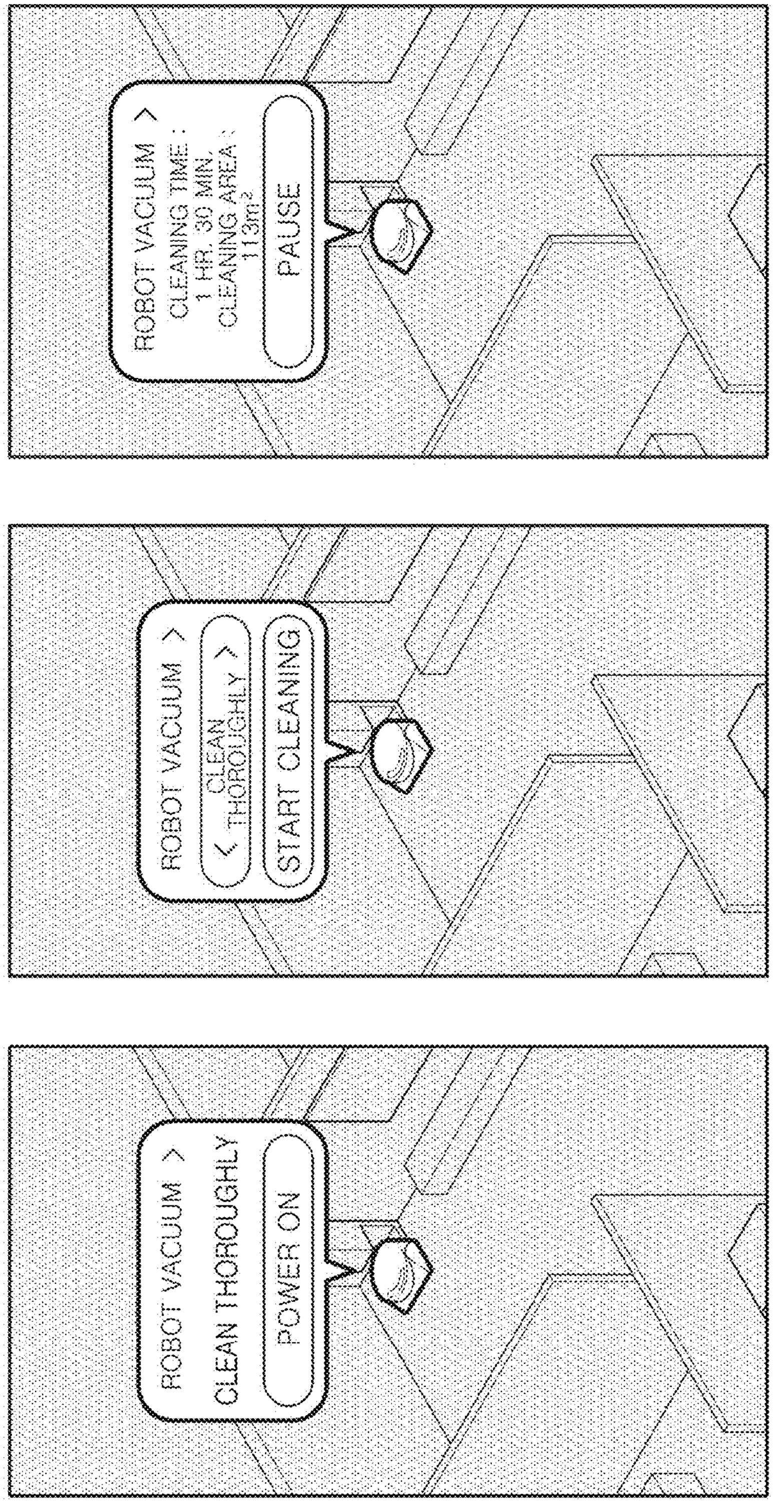

FIGS. 7A, 7B, and 7C illustrate an operation for controlling a home appliance on a 3D map according to various embodiments of the disclosure.

Referring to FIGS. 7A, 7B, and 7C, the electronic device may control an operation of the at least one home appliance based on a user input to a predetermined area on the 3D map.

According to an embodiment of the disclosure, the electronic device may determine a home appliance to be controlled, based on a user input to the at least one home appliance on the 3D map. For example, the electronic device may determine a home appliance to be controlled, based on the user's selection for the 3D image of at least one home appliance. For example, the electronic device may highlight and display the edge of the home appliance selected based on the user input. The electronic device may display the current status of the home appliance selected based on the user input. For example, the electronic device may display the current status of the home appliance selected by the user.

The electronic device may display an operation control window of the selected home appliance. For example, the electronic device may display an operation control window indicating an operation mode and an operation guide of the selected home appliance. The electronic device may operate the home appliance selected through the network, based on a user input. For example, the electronic device may operate the selected home appliance based on the user's operation mode selection. The electronic device may display home appliance status information about the operated home appliance.

Referring to FIG. 7A, the electronic device may control the operation of the home appliance (e.g., a standing air conditioner) based on a user input to the predetermined area on the 3D map. For example, the electronic device may display the home appliance (e.g., a standing air conditioner), selected based on the user input, with the edges highlighted.

For example, as shown in part (a) of FIG. 7A, the electronic device may display a power setting (e.g., power on) of the standing air conditioner. For example, as shown in part (b) of FIG. 7A, the electronic device may display an operation control window indicating at least one of an operation mode (e.g., clean), a set temperature (e.g., 21.5° C.), and a power setting (e.g., power off) of the standing air conditioner.

Referring to FIG. 7B, the electronic device may control the operation of the home appliance (e.g., a washing machine), based on a user input, to the predetermined area on the 3D map. For example, the electronic device may highlight and display the edge of the home appliance (e.g., a washing machine) selected based on the user input.

For example, as shown in part (a) of FIG. 7B, the electronic device may display the current status (e.g., standby mode) of the washing machine. For example, as shown in part (b) of FIG. 7B, the electronic device may display an operation control window indicating an operation mode (e.g., quick wash) and an operation guide (e.g., send to the washing machine) of the washing machine. For example, as shown in part (c) of FIG. 7B, the electronic device may operate the washing machine based on the user's operation mode selection (e.g., selecting quick wash). The electronic device may display status information (e.g., 1 hour and 30 minutes left) of the home appliance of the operated washing machine.

Referring to FIG. 7C, the electronic device may control the operation of the home appliance (e.g., a robot vacuum) based on a user input to the predetermined area on the 3D map. For example, the electronic device may highlight and display the edge of the home appliance (e.g., a robot vacuum) selected based on the user input.

For example, as shown in part (a) of FIG. 7C, the electronic device may display a power setting (e.g., power on) of the robot vacuum For example, as shown in part (b) of FIG. 7C, the electronic device may display an operation control window indicating an operation mode (e.g., clean thoroughly) and an operation guide (e.g., start vacuuming) of the robot vacuum. For example, as shown in part (c) of FIG. 7C, the electronic device may operate the robot vacuum based on the user's operation mode selection (e.g., clean thoroughly). The electronic device may display the home appliance status information (e.g., cleaning time and cleaning area) about the operated robot vacuum.

Figure 8:
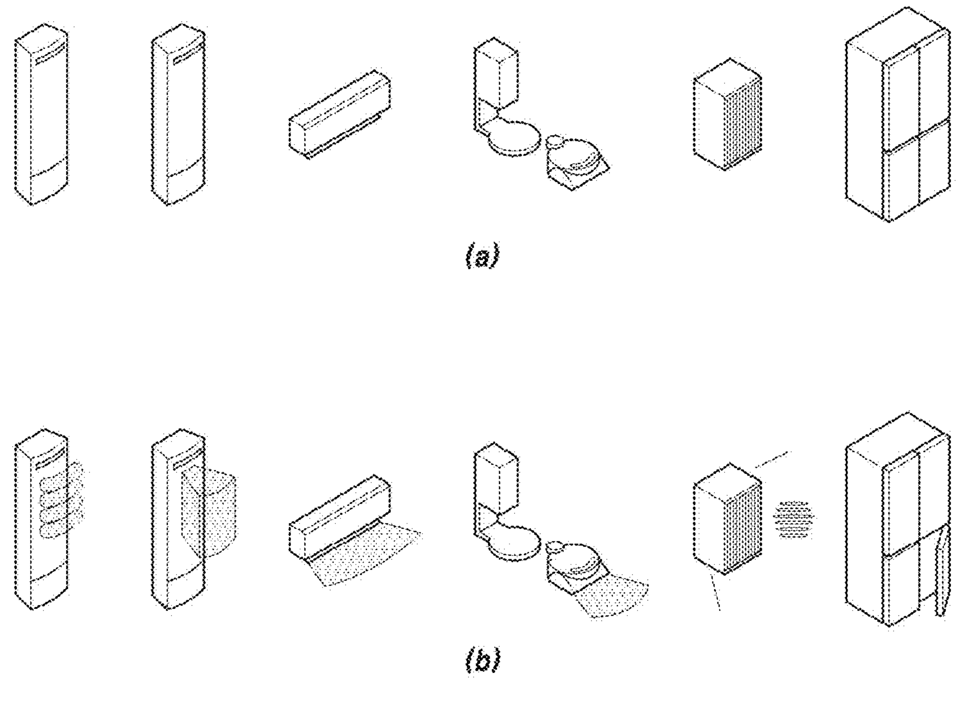
FIG. 8 illustrates visual information about a home appliance according to an embodiment of the disclosure.

FIG. 8 illustrates visual information about a home appliance according to an embodiment of the disclosure.

Referring to FIG. 8, the electronic device may display visual information about the at least one home appliance, as a 3D animation, on the 3D map, based on the home appliance status information. Specifically, part (a) of FIG. 8 illustrates a 3D image of a home appliance to which visual information is not reflected (or shown), and part (b) of FIG. 8 illustrates a 3D image of a home appliance to which visual information is reflected (or shown).

According to an example, the electronic device may receive the home appliance status information from the home appliance through a network, and display visual information corresponding to the home appliance status information. For example, the electronic device may store visual information for each home appliance status information about the at least one home appliance. The electronic device may receive home appliance status information and display visual information corresponding to the home appliance status information among the stored visual information. For example, the electronic device may receive visual information for each home appliance status information about the at least one home appliance from an external server. The electronic device may receive home appliance status information from the home appliance, and display visual information corresponding to the home appliance status information among the visual information received from the external server.

The visual information about the at least one home appliance may include at least one of a light on/off state, output wind direction (e.g., direction of airflow), output wind speed (e.g., strength or speed of airflow), output temperature, door open/close state, and moving state (e.g., move from one position to different position) of the at least one home appliance. For example, as illustrated in part (b) of FIG. 8, the electronic device may display visual information including at least one of a light on/off state, an output wind direction, an output wind speed, and an output temperature of at least one home appliance (e.g., a standing air conditioner or a wall-mounted air conditioner) as a 3D animation. Further, the electronic device may display visual information including a moving state of at least one home appliance (e.g., a robot vacuum) as a 3D animation. Further, the electronic device may display visual information including at least one of air suction and air discharge of at least one home appliance (e.g., an air purifier) as a 3D animation. Further, the electronic device may display visual information including the door open/close state of at least one home appliance (e.g., refrigerator) as a 3D animation.

As described above, the electronic device according to the disclosure may display the 3D map including the indoor space and the home appliance based on input data and display visual information about the home appliance, as the 3D animation, on the 3D map, thereby intuitively displaying the position and the operating status of the home appliance in the indoor space on the 3D map.

Figure 9A:
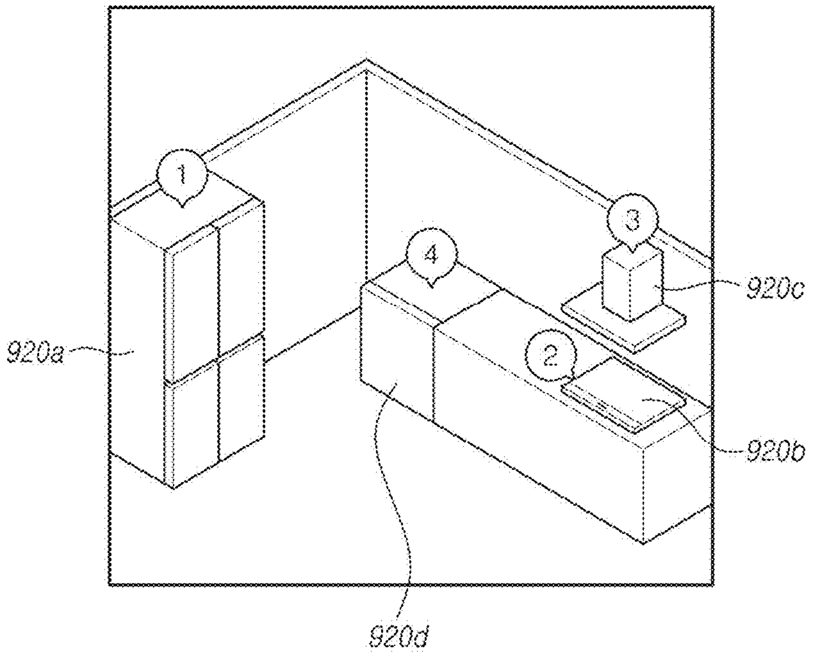
FIGS. 9A, 9B, and 9C illustrate an operation for sequentially displaying subtasks for performing a predetermined operation by an electronic device according to various embodiments of the disclosure.
Figure 9B:
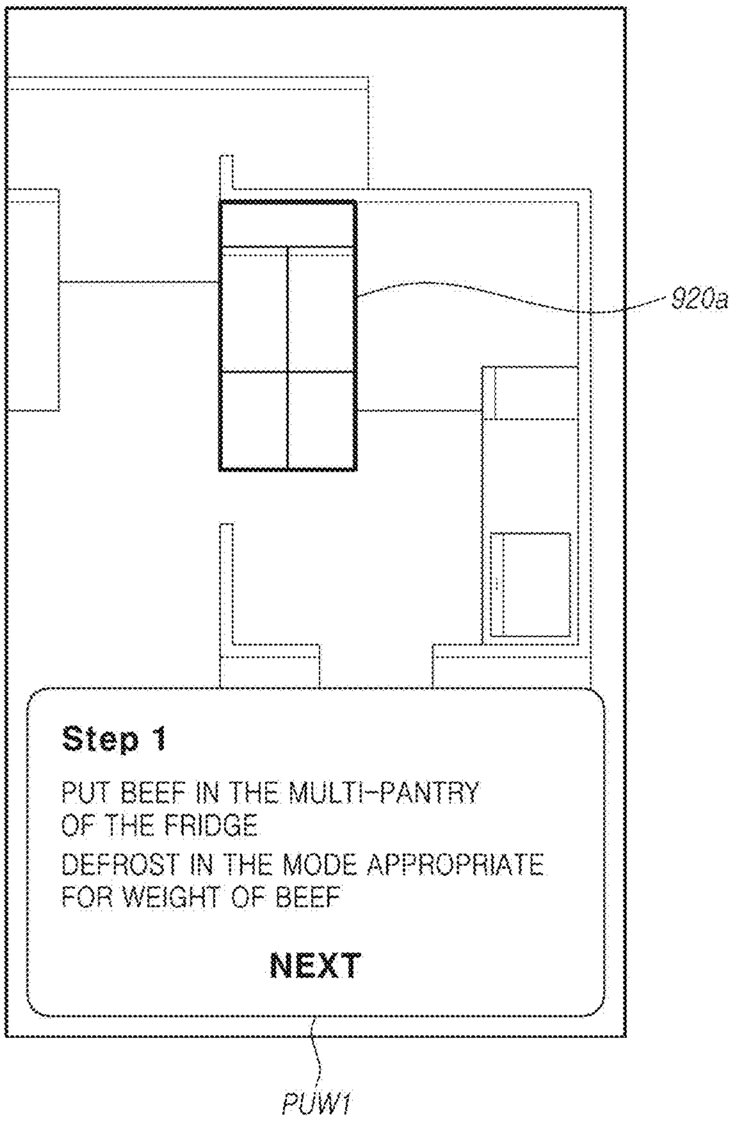
Figure 9C:
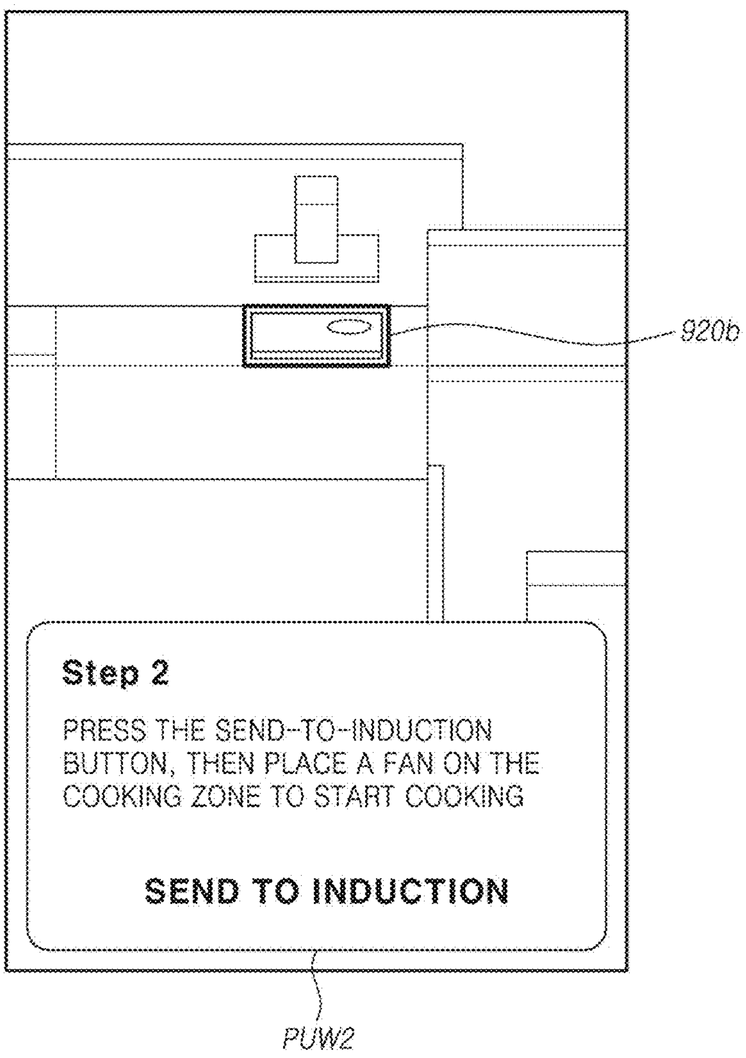

FIGS. 9A, 9B, and 9C illustrate an operation for sequentially displaying subtasks for performing a predetermined operation by an electronic device according to various embodiments of the disclosure.

Referring to FIGS. 9A, 9B, and 9C, the at least one processor may sequentially display at least one subtask of the at least one home appliance for performing a predetermined operation on the 3D map. The predetermined operation may include a complex operation performed as a series of subtasks of at least one home appliance. For example, the predetermined operation may include at least one of a cooking operation, a washing operation, or a cleaning operation performed as a series of subtasks of at least one home appliance.

According to an embodiment of the disclosure, the at least one home appliance may include at least one object (e.g., 920*a*, 920*b*, 920*c*, and 920*d*) for performing the predetermined operation. For example, the at least one home appliance may include a first object 920*a* and a second object 920*b* performing the at least one subtask for performing the predetermined operation. The predetermined operation may include performing a first subtask by the first object 920*a* and performing a second subtask associated with the first subtask by the second object 920*b*.

The electronic device may sequentially display, on the 3D map, an image displaying an operation sequence of the first object and the second object, a zoomed-in image of the first object, a pop-up window including text describing the first subtask, a zoomed-in image of the second object, and a pop-up window including text describing the second subtask.

Referring to FIG. 9A, the electronic device may display an image in which an operation sequence (e.g., 1, 2, 3, and 4) of the at least one object (e.g., 920*a*, 920*b*, 920*c*, and 920*d*) is displayed on the 3D map.

Referring to FIG. 9B, the electronic device may display an image in which the first object 920*a* is zoomed in. For example, the electronic device may display an image in which the first object 920*a* is accentuated and enlarged. The electronic device may display a pop-up window including text describing the first subtask. For example, the electronic device may display a guide message for the first subtask Step1 of the first object 920*a* in the pop-up window PUW1.

Referring to FIG. 9C, the electronic device may display an image in which the second object 920*b* is zoomed in. For example, the electronic device may display an image in which the second object 920*b* is accentuated and enlarged. The electronic device may display a pop-up window including text describing the second subtask. For example, the electronic device may display a guide message for the second subtask Step2 of the second object 920*b* associated with the first subtask Step1 of the first object 920*a* in the pop-up window PUW2.

As such, the electronic device may sequentially display a predetermined operation performed as a series of subtasks (e.g., Step1 and Step2) of at least one home appliance.

Figure 10A:
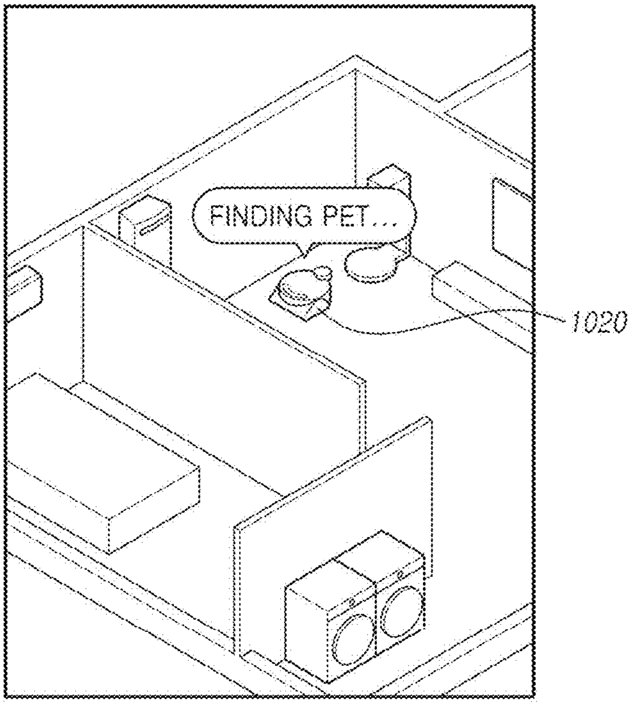
FIGS. 10A, 10B, and 10C illustrate an operation for sequentially displaying subtasks for performing a predetermined operation by an electronic device according to various embodiments of the disclosure.
Figure 10B:
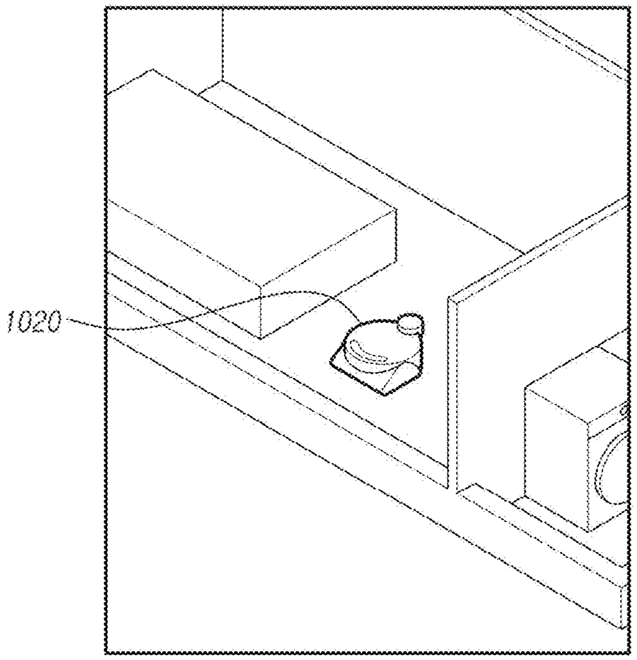
Figure 10C:
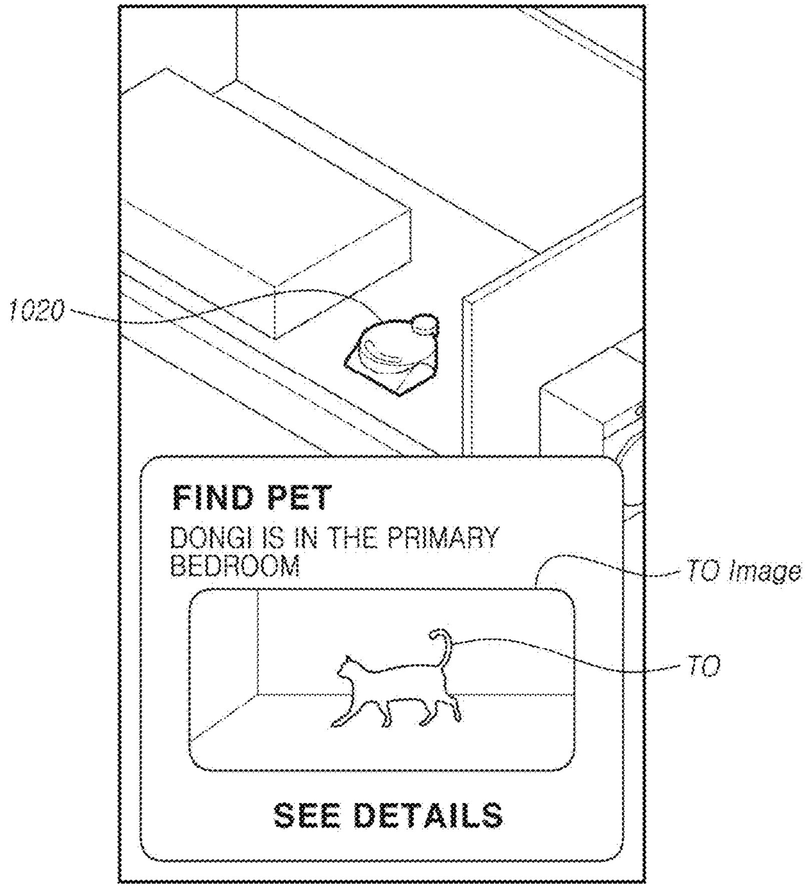

FIGS. 10A, 10B, and 10C illustrate an operation for sequentially displaying subtasks for performing a predetermined operation by an electronic device according to various embodiments of the disclosure.

Referring to FIGS. 10A, 10B, and 10C, the at least one processor may sequentially display at least one subtask of the at least one home appliance for performing a predetermined operation on the 3D map. The predetermined operation may include a sequential operation performed as at least one subtask of at least one home appliance capable of moving and capturing (e.g., recording a still image or moving images). For example, the predetermined operation may include at least one of a find pet operation and a security operation performed as at least one subtask of at least one home appliance capable of moving and capturing.

According to an example, the predetermined operation may include moving the at least one home appliance in the indoor space, detecting a target object included in the indoor space by the at least one home appliance, capturing the target object by the at least one home appliance, and displaying a target object image captured by the at least one home appliance.

The electronic device may sequentially display an image of the at least one home appliance moving in the indoor space, an image of the at least one home appliance detecting a target object included in the indoor space, an image of the at least one home appliance capturing the target object, and an image of target object captured by the at least one home appliance.

Referring to FIG. 10A, the electronic device may display an image of the at least one home appliance moving in the indoor space. For example, the electronic device may display an image of at least one home appliance 1020 (e.g., a robot vacuum) moving in real time in the indoor space to perform a predetermined operation (e.g., a find pet operation).

Referring to FIG. 10B, the electronic device may display an image in which the at least one home appliance 1020 detects a target object (TO) included in the indoor space and an image in which the at least one home appliance 1020 captures the target object. For example, the electronic device may display an image in which the at least one home appliance 1020 which is moving, after detecting the target object (e.g., a cat) in at least one divided space (e.g., primary bedroom) of the indoor space, stops moving and captures the target object.

Referring to FIG. 10C, the electronic device may display a target object moving images captured by the at least one home appliance 1020. For example, the electronic device may display a pop-up window including the target object moving images captured by the at least one home appliance 1020 and a notification message for the divided space (e.g., primary bedroom) in which the target object is detected.

As such, the electronic device may sequentially display a predetermined operation performed as at least one subtask of the at least one home appliance 1020 capable of moving and capturing.

Figure 11A:
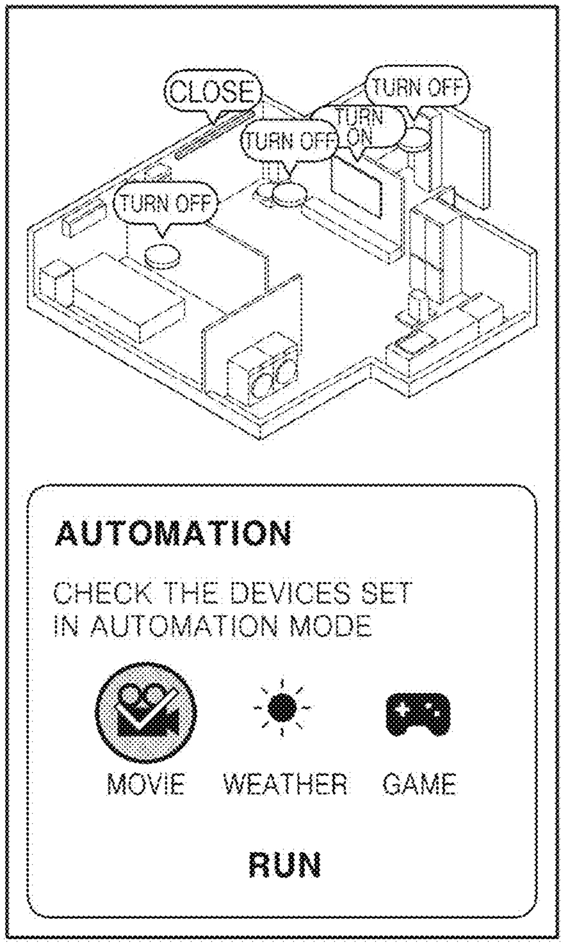
FIGS. 11A and 11B illustrate an operation for controlling a home appliance based on a predetermined operation by an electronic device according to various embodiments of the disclosure.
Figure 11B:
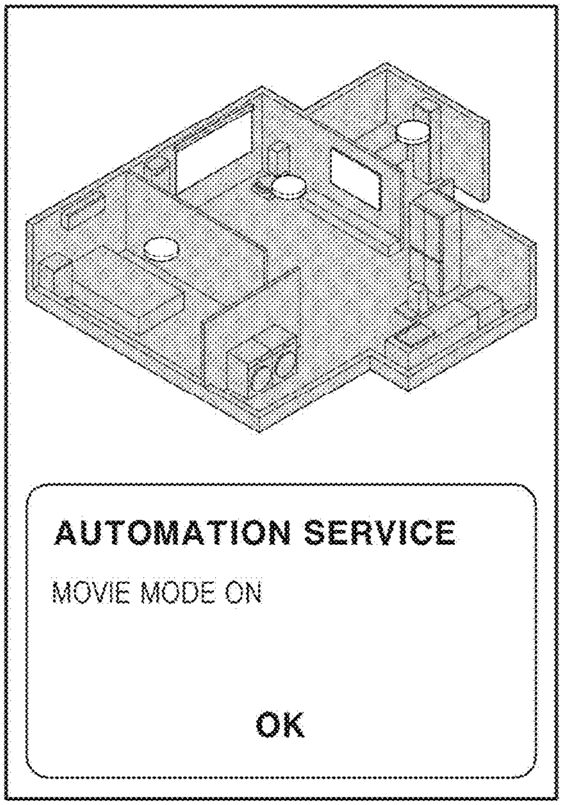

FIGS. 11A and 11B illustrate an operation for controlling a home appliance based on a predetermined operation by an electronic device according to various embodiments of the disclosure.

Referring to FIGS. 11A and 11B, the electronic device may control the at least one home appliance performing at least one subtask based on a predetermined operation on the 3D map. The predetermined operation may be an operation in which a home appliance is configured to a setting value optimized for an operational environment of an indoor space. For example, the predetermined operation may be an automation operation including at least one of a movie operation, a weather operation, and a game operation.

Specifically, the predetermined operation may include determining an operational environment of the at least one home appliance and setting at least one of a power setting, position, and operation mode of the at least one home appliance to a pre-stored operation configuration value.

Referring to FIG. 11A, the electronic device may display a pre-stored operation configuration value (e.g., turn off, close, or turn on) of at least one home appliance of a predetermined operation on a 3D map. The electronic device may receive a user input for a driving environment of the at least one home appliance. For example, the electronic device may receive a user input for selecting an automation operation. For example, the electronic device may receive a user input for selecting a movie operation from among automation operations.

Referring to FIG. 11B, the electronic device may control at least one of a power setting, position, and operation mode of the at least one home appliance, based on an operation configuration value corresponding to the operational environment. For example, in the movie operation, the electronic device may turn off at least one home appliance irrelevant to or not associated with movie watching. For example, in the movie operation, the electronic device may darken the indoor space by closing the electronic blinds. For example, in the movie operation, the electronic device may reduce the brightness of the lighting or turn off the lighting. For example, in the movie operation, the electronic device may turn on the TV. For example, in the movie operation, the electronic device may set the operation mode of the TV to movie mode.

As such, the electronic device of the disclosure may enhance usability and convenience of a home appliance by sequentially displaying and controlling associated operations of the home appliance for performing a predetermined operation.

Figure 12:
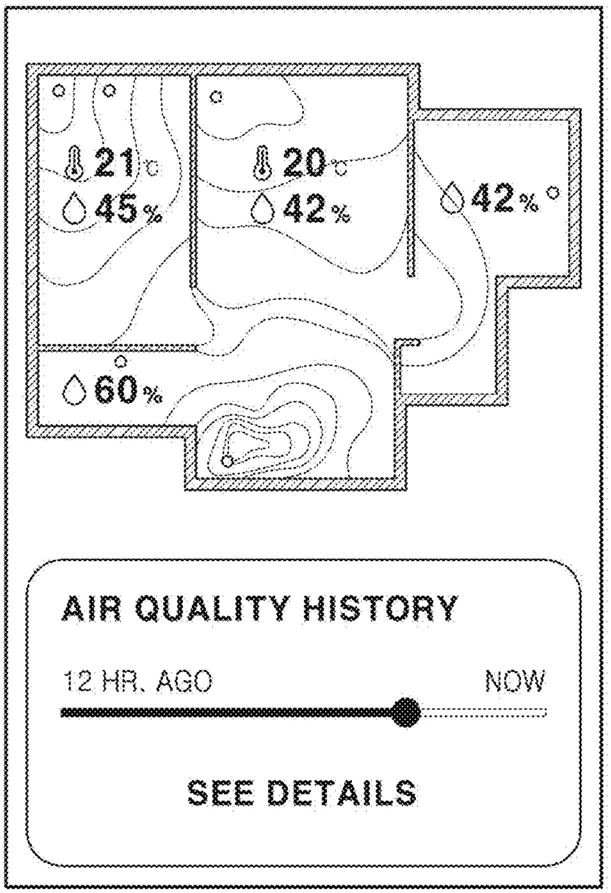
FIG. 12 illustrates an operation for displaying an indoor space status history by an electronic device according to an embodiment of the disclosure.

FIG. 12 illustrates an operation for displaying an indoor space state history by an electronic device according to an embodiment of the disclosure.

Referring to FIG. 12, the electronic device may display indoor space status information corresponding to the status of the indoor space on the 3D map. For example, the indoor space status information may include at least one of an air quality, temperature, humidity, lighting, and noise of the indoor space.

According to an example, the electronic device may generate an indoor space status history based on a change in the indoor space status information for a reference or a predetermined period (e.g., 12 hours). The at least one processor may display the indoor space status history for a specified time period (e.g., hourly).

For example, as shown in FIG. 12, the electronic device may store a change in indoor space status information (e.g., air quality of the indoor space) during a reference or predetermined period (e.g., 12 hours). The electronic device may generate an indoor space status history (e.g., an air quality history) based on a change in the air quality of the indoor space during the reference or a predetermined period. For example, the electronic device may display indoor space status information (e.g., air quality of the indoor space at a predetermined time point) at a predetermined time point, based on a user input.

Figure 13:
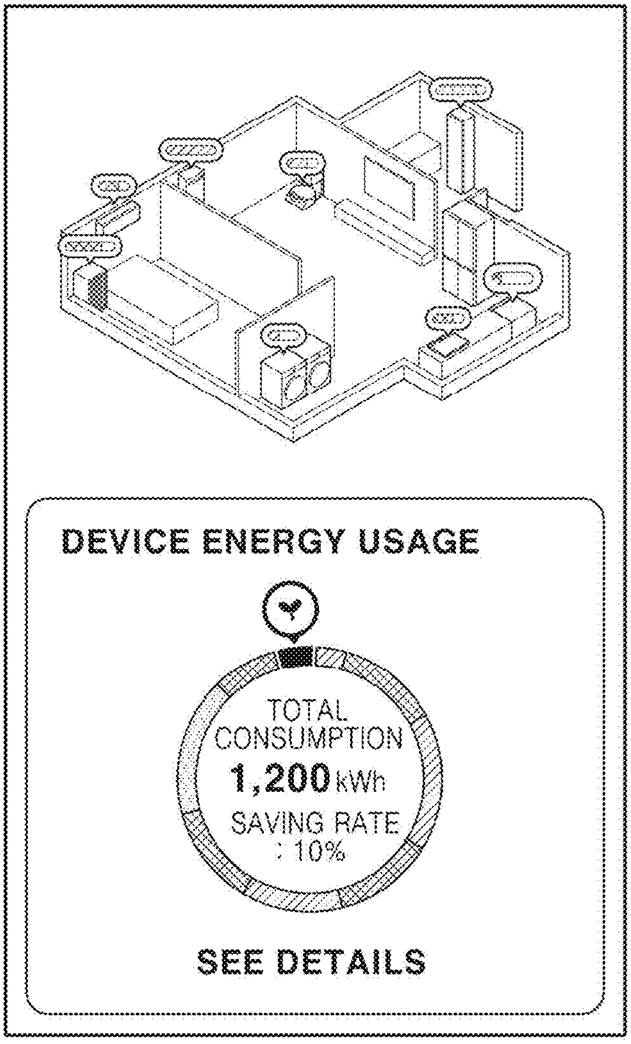
FIG. 13 illustrates an operation for displaying home appliance status information by an electronic device according to an embodiment of the disclosure.

FIG. 13 illustrates an operation for displaying home appliance status information by an electronic device according to an embodiment of the disclosure.

Referring to FIG. 13, the electronic device may display home appliance status information corresponding to the status of the at least one home appliance on the 3D map. For example, the home appliance status information may include at least one of an operation mode, a remaining time, an energy usage, a temperature, a remaining battery, and a position of the at least one home appliance.

Specifically, the electronic device may display an operation mode, a remaining time, an energy usage, a temperature, a remaining battery, and a position of the home appliance using at least one of a text, a numerical value, a color, an icon, a graph, and a contour line on the 3D map.

The electronic device may calculate statistics on home appliance status information of the indoor space based on the home appliance status information. The electronic device may compile home appliance status information about each of the at least one home appliance and display the home appliance status information of the indoor space as one piece of data. For example, as shown in FIG. 13, the electronic device may sum up the energy usage of at least one home appliance and calculate statistics on the total energy usage consumed in the indoor space based on the summed up energy usage. The electronic device may display statistics on the total energy consumption using at least one of text, numerical values, colors, icons, graphs, and contour lines.

Figure 14:
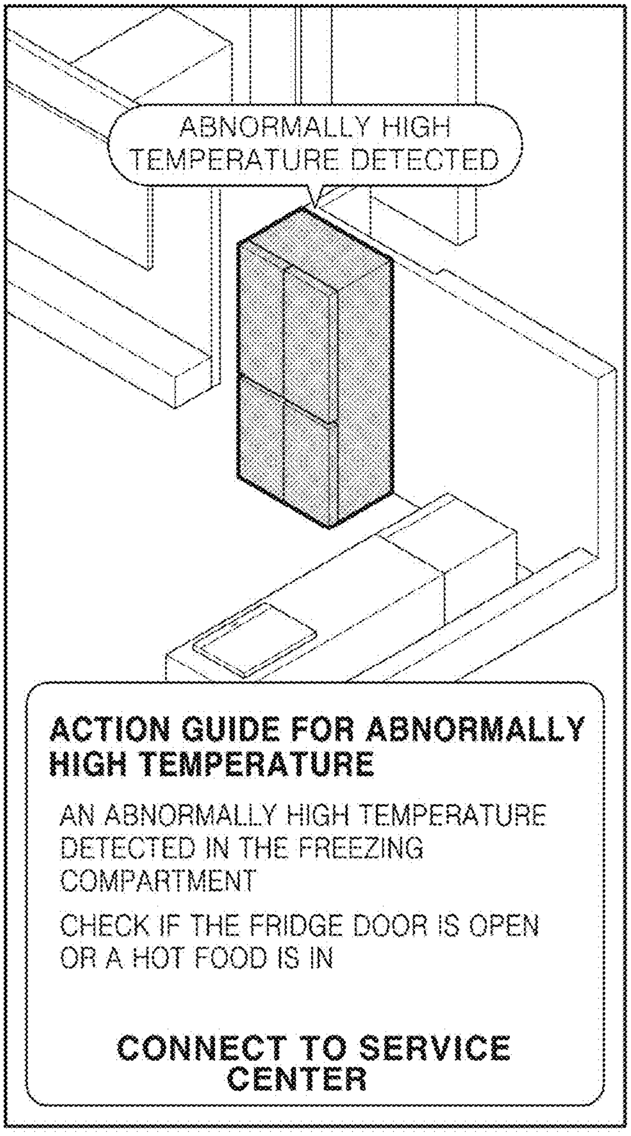
FIG. 14 illustrates an operation for detecting an operation error in a home appliance by an electronic device according to an embodiment of the disclosure.

FIG. 14 illustrates an operation for detecting an operation error in a home appliance by an electronic device according to an embodiment of the disclosure.

Referring to FIG. 14, the electronic device may detect an operation error in the at least one home appliance based on the home appliance status information. For example, the electronic device may detect an operation error including at least one of abnormally high temperature operation, abnormal power application, abnormal position change, abnormal energy consumption, and abnormal battery consumption of the at least one home appliance (e.g., refrigerator).

The electronic device may display the operation error and an action guide. For example, the electronic device may display a pop-up window including an operation error notification. The electronic device may display the action guide corresponding to the operation error in the pop-up window. The electronic device may display an access link for connecting to a service center in the pop-up window.

Figure 15:
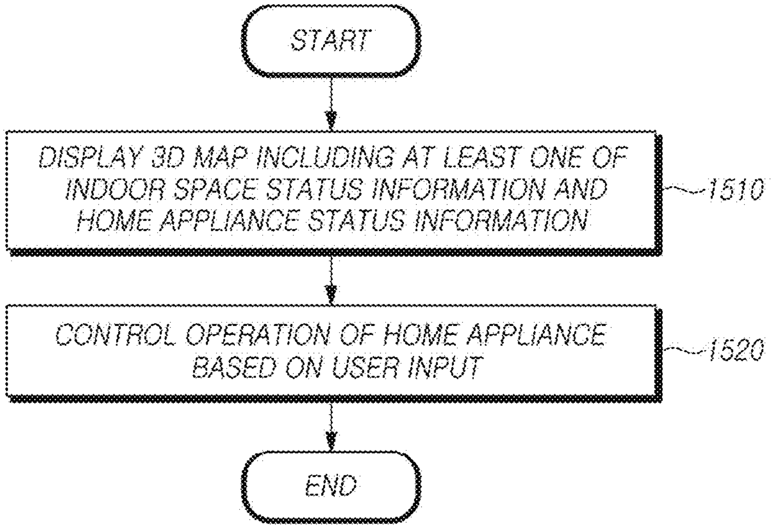
FIG. 15 illustrates a method for displaying and controlling a home appliance according to an embodiment of the disclosure.

FIG. 15 illustrates a method for displaying and controlling a home appliance according to an embodiment of the disclosure.

Referring to FIG. 15, a method for displaying and controlling a home appliance according to the disclosure may include displaying a 3D map including at least one of indoor space status information including an environmental status of an indoor space and home appliance status information including an operating status of at least one home appliance. The method for displaying and controlling the home appliance according to the disclosure may include controlling an operation of the at least one home appliance based on a user input to a predetermined area on the 3D map.

According to an embodiment of the disclosure, in operation 1510, the electronic device 201 may display the 3D map including at least one of indoor space status information corresponding to the status of the indoor space and home appliance status information corresponding to the status of the at least one home appliance.

For example, the electronic device 201 may obtain input data including 3D data of the indoor space and at least one home appliance.

For example, displaying the 3D map may display visual information about the at least one home appliance, as a 3D animation, on the 3D map, based on the home appliance status information.

For example, displaying the 3D map may sequentially display at least one subtask of the at least one home appliance for performing a predetermined operation on the 3D map.

According to an example, in operation 1520, the electronic device 201 may control an operation of the at least one home appliance based on a user input to a predetermined area on the 3D map.

For example, controlling the at least one home appliance may control the at least one home appliance performing at least one subtask based on a predetermined operation on the 3D map.

As described above, the method for displaying and controlling a home appliance according to the disclosure may display the 3D map including the indoor space and the home appliance based on input data and display visual information of the home appliance, as the 3D animation, on the 3D map, thereby intuitively displaying the position and the operating status of the home appliance in the indoor space on the 3D map.

Further, the method for displaying and controlling a home appliance according to the disclosure may enhance usability and convenience of a home appliance by sequentially displaying and controlling associated operations of the home appliance for performing a predetermined operation.

However, since this has been described above, no duplicate description is given.

The electronic device according to various embodiments of the disclosure may be one of various types of electronic devices. The electronic devices may include, for example, an electronic device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment of the disclosure, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., a magnetic storage media (e.g., a read-only memory (ROM), a random-access memory (RAM), a floppy disk, a hard disk, or the like) and an optically readable media (e.g., a CD-ROM or a digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display including a display area;
memory storing instructions; and
at least one processor operatively connected to the display and the memory,
wherein the instructions, when executed by the at least one processor individually or collectively, cause the electronic device to:
display a three-dimensional (3D) map including:
an indoor space 3D image corresponding to an indoor space,
at least two home appliance 3D images corresponding to at least two home appliances, respectively, which are disposed in the indoor space, and
at least one of:
indoor space status information including an environmental status of the indoor space, wherein the indoor space status information includes at least one of an air quality, temperature, humidity, lighting, or noise of the indoor space, or
home appliance status information, including an operating status, of the at least two home appliances, respectively, wherein the home appliance status information is displayed so as to be associated with the at least two home appliance 3D images, respectively,
sequentially display, on the 3D map, a first subtask of a first home appliance and a second subtask of a second home appliance for performing a predetermined operation, wherein the first home appliance and the second home appliance are among the at least two home appliances, wherein the second subtask of the second home appliance is associated with the first subtask of the first home appliance, and wherein the predetermined operation includes a complex operation performed as a series of subtasks including the first subtask of the first home appliance and the second subtask of the second home appliance, and
control an operation of at least one home appliance of the at least two home appliances based on a user input to a predetermined area on the 3D map.

2. The electronic device of claim 1, wherein the instructions, when executed by the at least one processor individually or collectively, further cause the electronic device to:
display visual information about one or more of the at least two home appliances, as a 3D animation, on the 3D map, based on the home appliance status information, wherein the home appliance status information excludes positional information indicative of respective positions of the at least two home appliances in the indoor space.

3. The electronic device of claim 2, wherein the visual information about one or more of the at least two home appliances includes at least one of a light on/off state, output wind direction, output wind speed, output temperature, door open/close state, or moving state of the at least one home appliance.

4. The electronic device of claim 1, wherein the instructions, when executed by the at least one processor individually or collectively, further cause the electronic device to:

sequentially display, on the 3D map, an image displaying an operation sequence of the first home appliance and the second home appliance, a zoomed-in image of the first home appliance, a pop-up window including text describing the first subtask, a zoomed-in image of the second home appliance, and a pop-up window including text describing the second subtask.

5. The electronic device of claim 1, wherein the predetermined operation includes:

moving the one or more of the at least two home appliances in the indoor space;

detecting a target object included in the indoor space by the one or more of the at least two home appliances;

capturing at least one image of the target object by the one or more of the at least two home appliances; and displaying the at least one image of the target object captured by the one or more of the at least two home appliances.

6. The electronic device of claim 1, wherein the instructions, when executed by the at least one processor individually or collectively, further cause the electronic device to:

sequentially display an image of the one or more of the at least two home appliances capable of moving in the indoor space, an image of the one or more of the at least two home appliances detecting a target object in the indoor space, an image of the one or more of the at least two home appliances capturing the target object, and an image of the target object captured by the one or more of the at least two home appliances.

7. The electronic device of claim 1, wherein the instructions, when executed by the at least one processor individually or collectively, further cause the electronic device to:

control at least one of the first home appliance and the second home appliance performing at least one of the first subtask and the second subtask based on a predetermined operation on the 3D map.

8. The electronic device of claim 7, wherein the predetermined operation includes:

determining an operational environment of the at least one home appliance; and setting at least one of a power setting, position, or operation mode of the at least one home appliance to a pre-stored operation configuration value.

9. The electronic device of claim 7, wherein the instructions, when executed by the at least one processor individually or collectively, further cause the electronic device to:

receive a user input for an operational environment of the at least one home appliance of the at least two home appliances, and control at least one of a power setting, position, or operation mode of the at least one home appliance of the at least two home appliances, based on an operation configuration value corresponding to the operational environment.

10. The electronic device of claim 1, wherein the instructions, when executed by the at least one processor individually or collectively, further cause the electronic device to:

display, on the 3D map, the at least one of indoor space status information or the home appliance status information using at least one of a text, a value, a color, an icon, a graph, or a contour line.

11. The electronic device of claim 1, wherein the instructions, when executed by the at least one processor individually or collectively, further cause the electronic device to:

generate an indoor space status history based on a change in the indoor space status information for a reference period, and display the indoor space status history for a specified time period.

12. The electronic device of claim 1, wherein the home appliance status information includes at least one of an operation mode, remaining time, energy usage, temperature, remaining battery, or home appliance position.

13. The electronic device of claim 1, wherein the instructions, when executed by the at least one processor individually or collectively, further cause the electronic device to:

detect an operation error in one or more of the at least two home appliances based on the home appliance status information, and display the operation error and an action guide.

14. A method, performed by an electronic device, comprising:

displaying a three-dimensional (3D) map including:

an indoor space 3D image corresponding to an indoor space, at least two home appliance 3D images corresponding to at least two home appliances, respectively, which are disposed in the indoor space, and at least one of:

indoor space status information including an environmental status of the indoor space, wherein the indoor space status information includes at least one of an air quality, temperature, humidity, lighting, or noise of the indoor space, or home appliance status information, including an operating status, of the at least two home appliances, respectively, wherein the home appliance status information is displayed so as to be associated with the at least two home appliance 3D images, respectively;

sequentially displaying, on the 3D map, a first subtask of a first home appliance and a second subtask of a second home appliance for performing a predetermined operation, wherein the first home appliance and the second home appliance are among the at least two home appliances, wherein the second subtask of the second home appliance is associated with the first subtask of the first home appliance, and wherein the predetermined operation includes a complex operation performed as a series of subtasks including the first subtask of the first home appliance and the second subtask of the second home appliance; and controlling an operation of at least one home appliance of the at least two home appliances based on a user input to a predetermined area on the 3D map.

15. The method of claim 14, wherein the displaying of the 3D map includes:

displaying visual information about one or more of the at least two home appliances, as a 3D animation, on the 3D map, based on the home appliance status information, wherein the home appliance status information excludes positional information indicative of respective positions of the at least two home appliances in the indoor space.

16. The method of claim 14, wherein the controlling of the at least one home appliance of the at least two home appliances includes:

controlling at least one of the first home appliance and the second home appliance performing at least one of the first subtask and the second subtask based on a predetermined operation on the 3D map.

* * * * *